(12) United States Patent
Billington et al.

(10) Patent No.: US 9,760,604 B2
(45) Date of Patent: Sep. 12, 2017

(54) SYSTEM AND METHOD FOR ADAPTIVE FILTERING OF DATA REQUESTS

(71) Applicant: GLUENT INC., Dallas, TX (US)

(72) Inventors: Adrian Brian Billington, England (GB); Paul Robert Bridger, London (GB); Tanel Poder, Irving, TX (US)

(73) Assignee: GLUENT INC., Dallas, TX (US)

( * ) Notice: Subject to any disclaimer, the term of this patent is extended or adjusted under 35 U.S.C. 154(b) by 0 days.

(21) Appl. No.: 15/383,674

(22) Filed: Dec. 19, 2016

(65) Prior Publication Data

US 2017/0185647 A1    Jun. 29, 2017

Related U.S. Application Data

(60) Provisional application No. 62/285,013, filed on Dec. 23, 2015.

(51) Int. Cl.
*G06F 17/30* (2006.01)

(52) U.S. Cl.
CPC .. *G06F 17/30466* (2013.01); *G06F 17/30867* (2013.01)

(58) Field of Classification Search
CPC .......... G06F 17/3015; G06F 17/30463; G06F 17/30457; G06F 17/30545; G06F 21/31;
(Continued)

(56) References Cited

U.S. PATENT DOCUMENTS

2009/0240711 A1 * 9/2009 Levin ................ G06F 17/30312
                                                707/E17.005
2010/0312756 A1   12/2010 Zhang et al.
(Continued)

OTHER PUBLICATIONS

International Search Report & Written Opinion issued in PCT/US2016/068293, dated Apr. 10, 2017, 10 pages.

*Primary Examiner* — Anh Ly
(74) *Attorney, Agent, or Firm* — Eversheds Sutherland (US) LLP

(57) ABSTRACT

This disclosure describes systems and methods related to filtering data requests. In some embodiments, a system may determine an execution plan tree. The system may determine a backend-processed target table in the at least one first storage device. The system may traverse at least one first branch and at least one first node in the execution plan tree. The system may traverse at least one second branch and at least one second node from the parent join node. The system may determine that the rowsource is referenced at the rowsource-access node. The system may determine that the rowsource referenced at the rowsource-access node is a filtered-rowsource. The system may extract at least one join column from a join condition associated with the backend-processed target table and the filtered-rowsource. The system may determine at least one storage location of the filtered-rowsource. The system may determine an adaptive processing path based at least in part on the at least one storage location of the filtered-rowsource, the at least one join column determined from the join condition and the at least one direct predicate determined for the filtered-rowsource. The system may generate at least one target filter predicate for the backend-processed target table.

15 Claims, 12 Drawing Sheets

(58) Field of Classification Search
CPC ......... G06F 12/0802; G06F 2212/1024; G06F 17/30466; G06F 17/30867; G06G 17/30224; H04L 67/42; H04L 67/1097
See application file for complete search history.

(56) References Cited

U.S. PATENT DOCUMENTS

| | | | | |
|---|---|---|---|---|
| 2012/0323929 | A1* | 12/2012 | Kimura | G06F 17/30339 707/748 |
| 2013/0132371 | A1* | 5/2013 | Bharath | G06F 17/30463 707/719 |
| 2013/0152088 | A1* | 6/2013 | Gkantsidis | G06F 17/30386 707/754 |
| 2014/0181076 | A1 | 6/2014 | Au et al. | |
| 2014/0280020 | A1 | 9/2014 | Singamshetty et al. | |
| 2014/0372365 | A1* | 12/2014 | Weyerhaeuser | G06F 17/30592 707/602 |
| 2015/0120746 | A1* | 4/2015 | Mindnich | G06F 17/30477 707/741 |
| 2015/0317360 | A1 | 11/2015 | Ngai et al. | |
| 2015/0363463 | A1 | 12/2015 | Mindnich et al. | |
| 2016/0335281 | A1* | 11/2016 | Teodorescu | G06F 17/30368 707/706 |
| 2016/0350368 | A1* | 12/2016 | Weyerhaeuser | G06F 17/30595 707/E17.005 |
| 2016/0350385 | A1* | 12/2016 | Poder | G06F 17/30545 707/E17.014 |

\* cited by examiner

SYSTEM AND METHOD FOR ADAPTIVE FILTERING OF DATA REQUESTS

CROSS REFERENCE TO RELATED APPLICATION

This application claims the benefit of U.S. Patent Application Ser. No. 62/285,013, titled "Systems and Method for Providing an Adaptive Join Filter Pulldown" filed on Dec. 23, 2015, the disclosure of which is incorporated herein by reference.

TECHNICAL FIELD

This disclosure generally relates to querying data from distributed databases and storage and more particularly, systems and methods for adaptive filtering of data requests.

BACKGROUND

Big Data solutions enable enterprise system operators to explore new opportunities for data processing, storage and analytics at a scale and cost that was previously prohibitive. Emerging technologies now exist that enable enterprise system operators to exploit hybrid configurations, whereby data is split between new processing backends such as Big Data solutions and "traditional" enterprise data stores such as RDBMSs. In hybrid configurations, the traditional data store becomes a processing frontend and may either read data that resides in the processing backend cluster or write (offload) data to the processing backend while requiring continued read access to the relocated data. Hybrid configurations must achieve good performance, however, so it is critical that access to data that resides in the processing backend is made available as efficient as possible when being accessed by the processing frontend.

BRIEF DESCRIPTION OF THE DRAWINGS

The detailed description is set forth through reference to the accompanying drawings, which are not necessarily drawn to scale. A brief description of each drawing is provided below. In the drawings, same reference numerals indicate similar or identical elements; however, different reference numerals may be used to indicate similar or identical elements as well.

DETAILED DESCRIPTION

Embodiments of the disclosure can provide systems and methods for adaptive filtering of data requests. Certain embodiments of the disclosure can provide distributed storage management systems and methods. In certain embodiments, a distributed storage management system can include one or more servers and/or storage devices using relatively efficient protocols for reading the relevant data from one or more computer-readable media in the storage devices. In certain embodiments, a distributed storage management method can include encoding relevant data read from the one or more computer-readable media, transferring the encoded data, decoding the data, and storing the data on one or more computer-readable media and/or memory in the servers. In certain embodiments, a distributed storage management method can include transparent context-aware filtering of data requests. Certain embodiments of the disclosure can provide technical effects such as improving the functionality and/or operations of a computer in itself by reducing the amount of time the computer and/or server needs to transfer relevant data to one or more requesting user devices.

Figure 1:
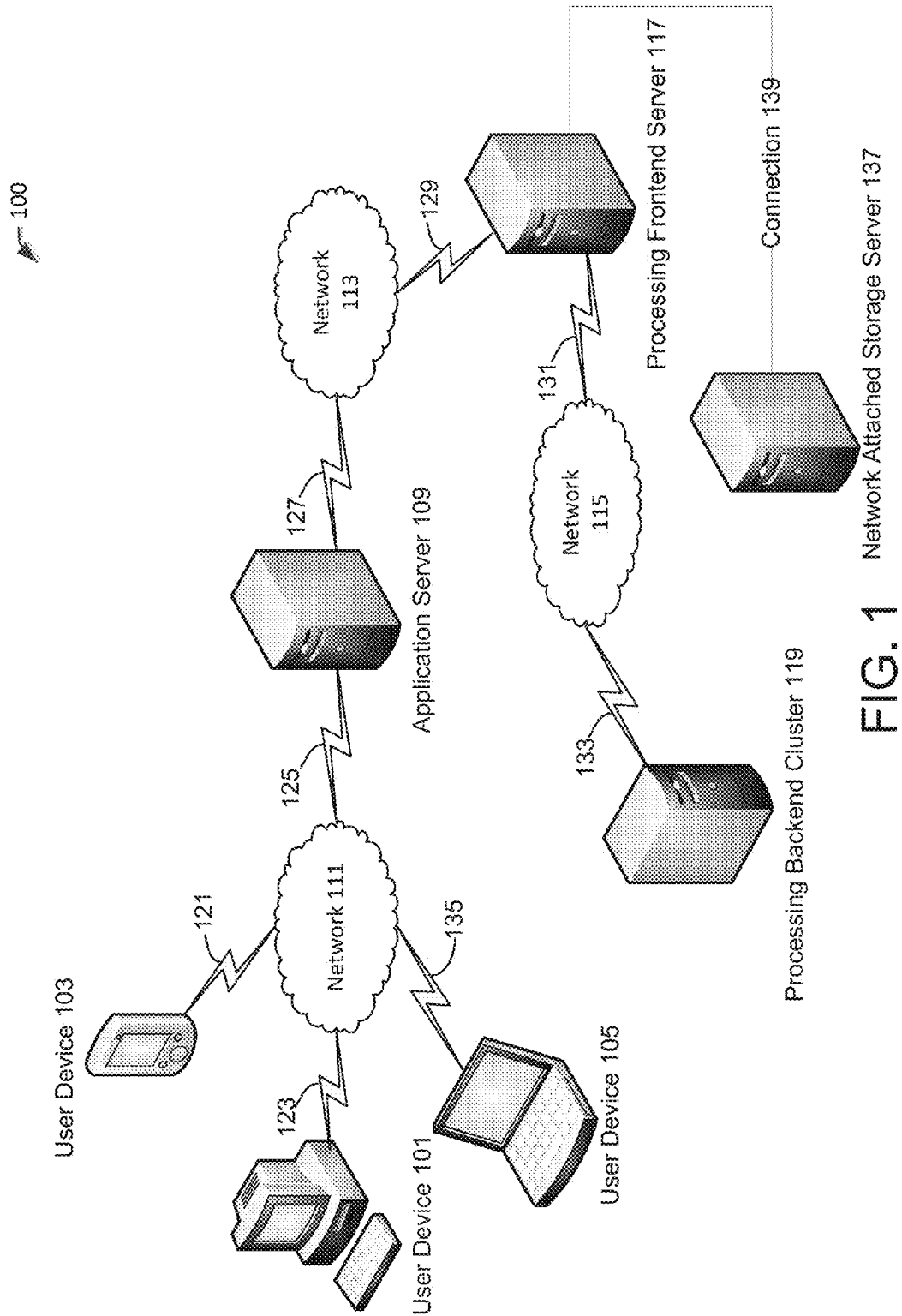
FIG. 1 depicts a network diagram illustrating an example network environment for requesting data from a storage device, in accordance with one or more embodiments of the disclosure.

FIG. 1 depicts a network diagram illustrating an example network environment for requesting data from at least one storage device, in accordance with one or more embodiments of the disclosure. While exemplary network environment 100 is directed to a network environment that may include one or more wired or wireless links, it is appreciated that network environment 100 can be any type of network that communicates using packets.

Network environment 100 may include one or more user devices (e.g., User Device 101, User Device 103, User Device 105), an application server (e.g., Application Server 109), a processing frontend server (e.g., Processing Frontend Server 117), a processing backend cluster (e.g., Processing Backend Cluster 119), a network attached storage device (e.g., Network Attached Storage Server 137) and one or more networks (e.g., Networks 111, 113, and 115). One or more of the user devices may communicate with the application server using wireless links and/or wired links. For example, User Device 103 may communicate with Application Server 109 using a wireless connection (e.g., Connection 121) to connect to an access point (not shown), within Network 111, that may communicate with Application Server 109 using a wired connection (e.g., Connection 125), thereby establishing a communication link between User Device 103 and Application Server 109. As another example, User Device 101 may communicate with Application Server 109 using a wired and/or wireless connection (e.g., Connection 123) to connect to a router (not shown) and/or switch (not shown), within Network 111, that may communicate with Application Server 109 using a wired connection (e.g., Wired Connection 125), thereby establishing a communication link between User Device 101 and Application Server 109. As yet another example, User Device 105 may communicate with Application Server 109 using a wired and/or wireless connection (e.g., Connection 135) to connect to a router (not shown) and/or switch (not shown), within Network 111, that may communicate with Application Server 109 using a wired connection (e.g., Connection 125), thereby establishing a communication link between User Device 105 and Application Server 109. In some embodiments, the access point may and switch and/or router may be the same device and may route packets or switch frames between the user devices and the application server. Connection 121 may be implemented using one or more wireless communication standards. In some embodiments, any of the wireless personal area network protocols disclosed in the Wi-Fi Alliance standards, colloquially known as the Institute for Electrical and Electronics Engineers' (IEEE) 802.11 standards, may be used. For example, User Device 103 may connect to Network 111 using the IEEE 802.11 a, b, g, n, ac, ad, af, ah, ai, aj, aq, ax, and/or ay standards. In other embodiments, Connection 121 may be implemented using one or more cellular network standards as well. For example, User Device 103 may connect to Network 111 using Global System for Mobile Communication (GSM), Universal Mobile Telecommunication System (UMTS), Code Division Multiple Access (CDMA), CDMA 2000, and/or Long Term Evolution (LTE). In some embodiments, Connection 123 may be implemented using one or more of the same wireless communication standards used in implementing Connection 121. Connections 123, 125, and 135 may be implemented using one or more wired communication standards. For example, Connections 123, 125, 127, 129, 131, 133, and 135 may be implemented using any of the IEEE 802.1 or 802.3 standards. For instance, Connections 123, 125, and 135 may be implemented using an IEEE 802 Local Area Network (LAN) connection protocol, a IEEE 802 Metropolitan Area Network (MAN) connection protocol, or a Wide Area Network (WAN) connection protocol. Connections 123, 125, and 135 may be implemented using IEEE 802.1 B, D, E, F G, H, Q, X, AB, AC, AE, AR, AS, AX, BA, BR, and/or CB. In some embodiments, Connections 123, 125, 127, 129, 131, 133, and 135 may be implemented using one or more wireless broadband standards. For example, Connections 127 and 129 may be implemented using wireless broadband standard IEEE 802.16, colloquially referred to as Worldwide Interoperability for Microwave Access (WiMAX), and Connections 131 and 133 may be implemented using LTE, High Speed Packet Access (HSPA), or Enhanced Data Rates for GSM Evolution (EDGE).

Networks 111, 113, and 115 may include one or more routers and/or switches that forward or switch packets between two endpoints. For example, Network 113 may route packets and/or switch frames between Application Server 109 and Processing Frontend Server 117 in either direction (i.e., from Application Server 109 to Processing Frontend Server 117 and vice versa). In some embodiments. Networks 111, 113, and/or 115 may include one or more cellular masts to provide cellular connectivity between endpoints connected to Networks 111, 113, and/or 115. For example, User Device 103 may be a mobile computing device (e.g., cellular phone) that connects to one or more mobile telecommunication service provider networks by sending and receiving signals to cellular masts in Network 111 associated with the one or more mobile telecommunication service provider networks. In other embodiments, fixed wireless or wired point-to-point links may be used in Networks 111, 113, and/or 115.

Application Server 109 may be a device that can be represented by any electronic addressable format, and can exist as a standalone device, or may be one of several servers in a server farm. Application Server 109 may be a physical and/or virtual server. In some embodiments. Application Server 109 may include a hardware layer, an operating system, and a hypervisor creating or managing one or more virtual machines. Application Server 109 may provide one or more services to one or more user devices. These services may include providing one or more applications to one or more user devices (e.g., User Devices 103, 101, and/or 105). The applications may include, for example, Structured Query Language (SQL) applications. For example, one or more SQL applications may include any application that uses a database. For instance, a customer relationship management (CRM) system, contacts database, company Intranet system, financial services trading application platforms, or reporting applications may be executed on one or more processors using one or more SQL statements. Application Server 109 may send requests/queries to Processing Frontend Server 117 for data stored either on Processing Frontend Server 117 or Processing Backend Cluster 119 using Network 113. For example, Application Server 109 may receive a request from User Device 105 for data about one or more sales transactions within a month of sales transactions not inclusive of the entire month of sales transactions. For instance, an application executing on User Device 105 may audit the number of sales transactions within a given month wherein the total amount of money received by a business exceeds a certain threshold. Application Server 109 may send a request to Processing Frontend Server 117 to retrieve the data that may be locally stored on Processing Frontend Server 117 or stored in a backend storage device (e.g., Processing Backend Cluster 119).

Processing Frontend Server 117 may be a server storing one or more computer-executable instructions or instruction sets in one or more memories that enables the server to provide access to a database stored in computer-readable media in the server to one or more user devices that may connect to the server. The one or more computer-executable instructions or instruction sets may be referred to as a Database Management System (DBMS). In some embodiments, the DBMS may be an open-source RDBMS such as MySQL or PostgreSQL or a commercial RDBMS such as Oracle™ Database or Microsoft™ SQL Server. The one or more instructions or instruction sets may include one or more query languages. There may be one or more processors on the server that may receive a query from a user device for data, and may convert the query to a format that is compatible with the one or more computer-executable instructions or instruction sets executed by the one or more processors to retrieve data relevant to the request of the user device. In some embodiments, the data requested by the user device may be stored in computer-readable media that may be in the server. For example, there may be one or more hard drives/disks accessible by the one or more processors via a system bus connecting the processor to the one or more hard drives/disks. In some embodiments, the computer-readable media may be one or more physical and/or virtual hard drives/disks. In some embodiments, the one or more physical and/or virtual hard disks may be a part of a storage array such as Network Area Storage (NAS) device (e.g., Network Attached Storage Server 137) via Connection 139 (e.g., wired or wireless connection) or they may be a part of one or more distributed storage devices that are accessible to the server via a network connection (e.g., Network 115). The storage array or distributed storage devices may be referred to as backend storage. In some embodiments, the one or more computer-executable instructions may cause the processor to send a request to one or more processors in the backend storage to read data from the one or more hard disks in response to a request from a user device to retrieve/fetch data from the one or more hard disks. In other embodiments, the one or more computer-executable instructions may cause the processor to a request to the one or more processors in the backend storage to write data to the one or more hard disks in response to a request from the user device to store data on the one or more hard disks.

Processing Backend Storage 119 may include one or more computer-readable media storing data and one or more processors that may read and/or write the data from or to the one or more computer-readable media. The one or more processors may receive a request from one or more processors in a Processing Frontend Server 117 to read data from the one or more computer-readable media in Processing Backend Cluster 119 corresponding to a request transmitted to Processing Frontend Server 117 from Application Server 109. The request may correspond to an application executing on Application Server 109, and hosted for a user device (e.g., User Device 101). Processing Backend Cluster 119 may be a physical or Cloud-resident distributed storage cluster hosting distributed computing technologies including, but not limited to, Hadoop, Google™ BigQuery, Amazon™ RedShift or Spark. Even though Processing Backend Cluster 119 is depicted by a single device, it is not limited to a single device. For example, Processing Backend Cluster 119 may be a distributed storage device that manages a file system spanning one or more server racks distributed throughout the world. For instance, returning to the example above in which a user device (e.g., User Device 105) requests sales data from a backend storage device, the backend storage device may be a file system wherein the files in the file system are distributed across one or more hard disks belonging to server racks on different continents. As a result, the backend storage device, storing the data requested by the user device, may not be on the same continent as user device requesting the data.

Figure 2:
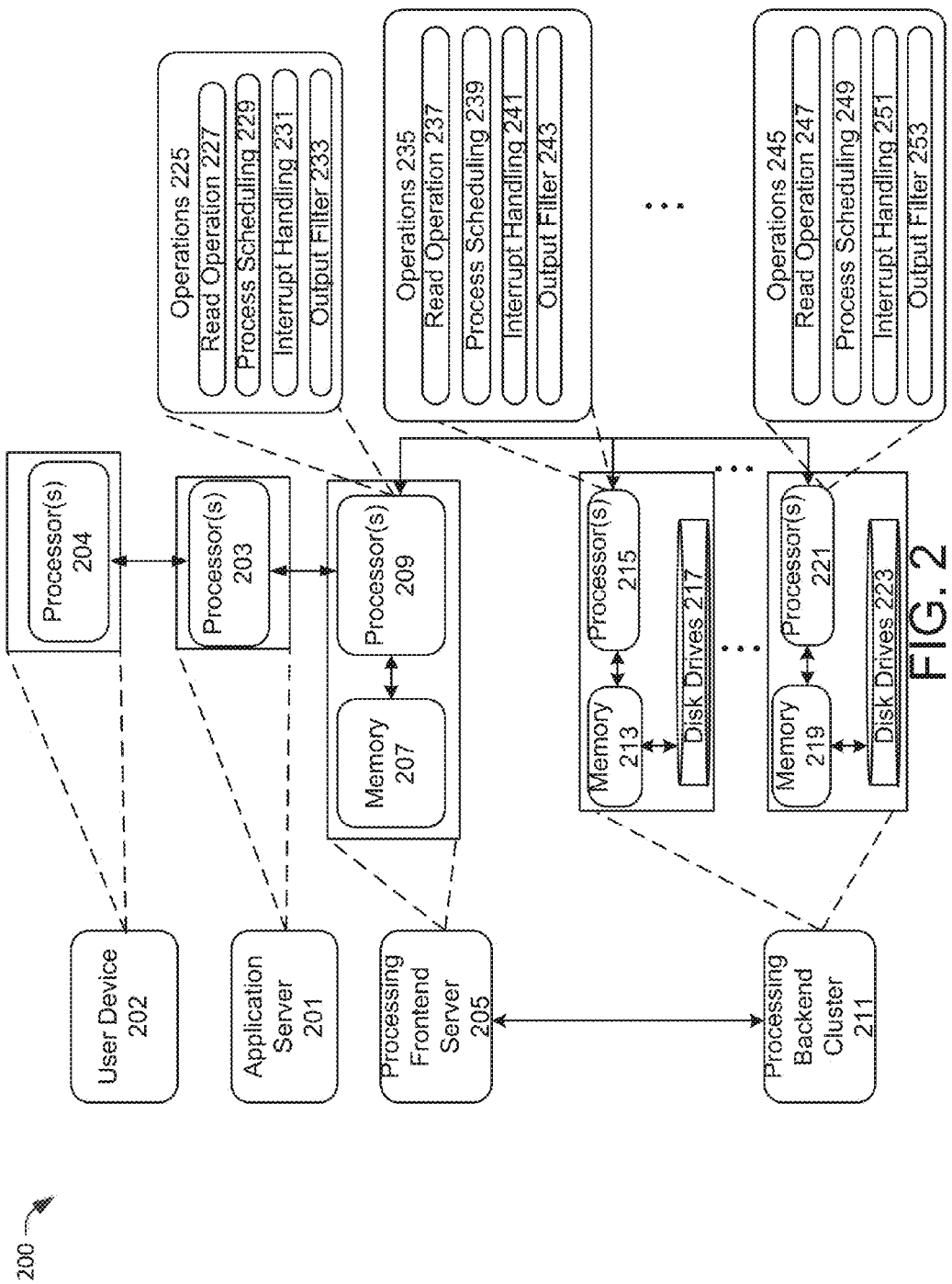
FIG. 2 is a schematic block diagram depicting intercommunication connections between one or more components of an illustrative user device, application server, server device, and storage device in accordance with one or more embodiments of the disclosure.

FIG. 2 is a schematic block diagram depicting intercommunication connections between one or more components of an illustrative user device, application server, server device, and storage device in accordance with one or more embodiments of the disclosure.

Logical intercommunication connections 200 may include logical connections between one or more processors in a user device requesting access to one or more applications that may be executed by one or more processors in an application server hosting the one or more applications. Logical intercommunication connections 200 may include logical connections between one or more processors on the application server requesting access to data stored in one or more computer-readable media stored on a backend storage device. The application server (e.g., Application Server 201) may include, among other electrical components, one or more processors (e.g., Processor(s) 203) that may be communicatively connected to one or more processors (e.g., Processor(s) 209) in a processing frontend server (e.g., Processing Frontend Server 205) via one or more data networks. The processing frontend server may include a memory (e.g., Memory 207) that may store one or more computer-executable instructions and/or instruction sets that may be executed by the one or more processors in the processing frontend server. The processing frontend server may also be connected to a network attached storage server (e.g., Network Attached Storage Server 137) that may be physical storage that is used by the processing frontend server to store files relevant and/or necessary for the operation of the processing frontend server. For instance, the network attached storage server may store files that may be necessary to transport data from network attached storage server to certain distributed storage clusters. For example, the processing frontend storage server may store hybrid query data temporarily in the physical storage of the network attached storage server and one or more computer executable instructions stored in the files necessary for the operation of the processing frontend storage server may be executed by the processing frontend storage server that may cause the hybrid query data to be transferred to a processing backend cluster such as Processing Backend Cluster 211. In some embodiments, the one or more computer-executable instructions and/or instruction sets may be executed by the one or more processors in the processing frontend server in response to the one or more processors in the application server. For example, Processor(s) 203 may send a data communication signal (e.g., Internet Protocol packet) to Processor(s) 209 including one or more computer-executable instructions causing Processor(s) 209 to execute one or more computer-executable instructions in Memory 207 that cause Processor(s) 209 to read data stored on one or more computer-readable media. The data read from the one or more computer-readable media may be used by Processor(s) 209 to execute the one or more computer-executable instructions and/or instruction sets. The execution of the one or more computer-executable instructions and/or instruction sets may correspond to an application hosted on Processing Frontend Server 205 to one or more user devices (e.g., User Device 202). For example, Processing Frontend Server 205 may host an application including one or more computer-executable instructions which when executed by Processor(s) 209, in response to Processor(s) 203 sending a data communication signal to Processor(s) 209, cause Processor(s) 209 to send a signal to Processor(s) 203 causing Processor(s) 203 to send a signal to a display on User Device 202 to display the application being executed by Processor(s) 209. For instance, User Device 202 may request access to an application executing on Processor(s) 209 that may provide access to data relevant to one or more sales transactions within a month of sales transactions not inclusive of the entire month of sales transactions. The application may create an audit data of the number of sales transactions within a given month wherein the total amount of money received by a business exceeds a certain threshold. Thus, Processor(s) 209 may send a signal to Processor(s) 204 including audit data, and Processor(s) 204 may display the data on a display. In some embodiments, User Device 202 may include one or more first computer-executable instructions stored in a memory that may cause Processor(s) 204 to determine, compute, and/or calculate data using the audit data.

Logical intercommunication connections 200 may also include a connection between a processing frontend server that hosts applications that may be accessed by one or more user devices, and one or more distributed storage devices storing data relevant and/or necessary for the applications to execute. As an example. Processing Frontend Server 205 may communicate with Processing Backend Cluster 211 via a logical intercommunication connection between Processor(s) 209 and Processor(s) 215 . . . Processor(s) 221 and request data stored on one or more computer-readable media in Processing Backend Cluster 211 (e.g., Disk Drives 217 . . . 223). Although Processing Backend Cluster 211 is depicted as a single device, Memory 213, Processor(s) 215, and Disk Drive 217 may form a first computing device that may be physically located in a first location (e.g., Bangalore, India) and Memory 219, Processor(s) 221, and Disk Drive 223 may form a second computing device that may be physically located in a second location (e.g., Leeds, United Kingdom). One or more computer-executable instructions and/or instruction sets, stored in Memory 207, may be executed by Processor(s) 209, in response to receiving a first signal from Processor(s) 203 requesting access to an application hosted by Processing Frontend Server 205, that may cause Processor(s) 209 to send a first signal to Processor(s) 215 . . . Processor(s) 221 to read data from one or more of Disk Drives 217 . . . 223 that may be relevant to the execution of the application by Processor(s) 209. In some embodiments, Processor(s) 203 may communicate with Processor(s) 209 via a data network connection that may be established between a first network interface card (NIC) communicatively coupled to Processor(s) 203 and a second NIC communicatively coupled to Processor(s) 209. For example, User Device 202 and Processing Frontend Server 205 may communicate with each other using network connections similar to Connections 125, 127, and 129.

Processing Frontend Server 205 may store in a memory (e.g., Memory 207) one or more computer-executable instructions that may cause Processor(s) 209 to execute one or more computer-executable operations (e.g., Operations 225). The one or more computer-executable operations may include a read operation (e.g., Read Operation 227) wherein Processor(s) 209 may send data communication signals (e.g., Internet Protocol packets), to one or more processors (e.g., Processor(s) 215 . . . Processor(s) 221), including one or more computer-executable instructions which may cause Processor(s) 215 . . . Processor(s) 221 to cause a disk controller (not shown) controlling access to one or more computer-readable media (e.g., Disk Drives 217 . . . Disk Drives 223). In particular, Processor(s) 209 may send one or more data communication signals to Processor(s) 215 . . . Processor(s) 221 requesting data stored on one or more of Disk Drives 217 . . . Disk Drives 223. The one or more signals may include computer-executable instructions that may cause Processor(s) 215 . . . Processor(s) 221 to send one or more signals to the one or more disk controllers in Disk Drives 217 . . . Disk Drives 223 that may cause one or more read/write heads in each of Disk Drives 217 . . . Disk Drives 223 to transform electromagnetic signals to electrical signals to read data from a platter in Disk Drives 217 . . . Disk Drives 223. In some embodiments, the one or more read/write heads in each of Disk Drives 217 . . . Disk Drives 223 may transform received electrical signals to electromagnetic signals to write data to the platters.

In some embodiments Processor(s) 209 may send one or more first computer-executable instructions, including a high-level data request, in one or more data communication signals that may cause Processor(s) 215 . . . Processor(s) 221 to execute one or more second computer-executable instructions, to cause Processor(s) 215 . . . Processor(s) 221 to read data, corresponding to the data request, from one or more of Disk Drives 217 . . . Disk Drives 223. For example, the high-level data request may include extensions that may cause Processor(s) 215 . . . Processor(s) 221 to process a request for data using a pushdown filter or pulldown filter, based on relevancy context data, received from Processor(s) 209. Thus, Processor(s) 209 may execute Read Operation 227 by sending a first signal to Processor(s) 215 . . . Processor(s) 221 which may in turn send a second signal to the disk controllers that may cause the disk controllers to move the read/write heads to a location on the platters associated with data that may be requested by Processor(s) 209 for an application being executed by Processor(s) 209. The read/write heads may transform one or more electromagnetic signals corresponding to the requested data on the platter to electrical signals, and may send the electrical signals to Processor(s) 215 . . . Processor(s) 221 which may in turn send a data communication signal to Processor(s) 209, including the requested data. Processor(s) 215 . . . Processor(s) 221 may also send one or more signals to the disk controller to write (i.e., transform one or more electrical signals to electromagnetic signals) data to the platter. For example, Processor(s) 209 may receive data from Processor(s) 215 . . . Processor(s) 221 and may process the data and may determine that the processed data should be stored in one or more of Disk Drives 217 . . . Disk Drives 223 and thus may send one or more data communication signals, corresponding to the processed data, to Processor(s) 215 . . . Processor(s) 221, and Processor(s) 215 . . . Processor(s) 221 may store the processed data in Disk Drives 217 . . . Disk Drives 223. Memory 207 may store one or more first computer-executable instructions that may cause Processor(s) 209 to send one or more data communication signals including one or more second computer-executable instructions to cause Processor(s) 215 . . . Processor(s) 221 to store the processed data in a predetermined location on the platter of one or more of Disk Drives 217 . . . Disk Drives 223. In particular, the one or more second computer-executable instructions may cause Processor(s) 215 . . . Processor(s) 221 to write the processed data to the one or more platters and one or more locations on each platter on Disk Drives 217 . . . Disk Drives 223. Memory 207 may include one or more computer-executable instructions that may cause Processor(s) 209 to filter data in a database table. This may reduce the amount of bandwidth required by Processor(s) 209 to send a data communication signal including the data corresponding to a request for the data to the requesting processors (e.g., Processor(s) 203).

In some embodiments Processor(s) 209 may read relevancy context data from Memory 207 in relation to a request for data. The relevancy context data may include predicates and/or column projections. Processor(s) 209 may prepare instructions for Processor(s) 215 and 221 in the form of a SQL-on-Hadoop query. Based on the relevancy context, this query can include pushed filters (filters on the offloaded dataset residing in part on Processing Backend Cluster 211), pulled join filters (filters on tables that are joined to the offloaded dataset that can be pre-processed to generate additional filters for the SQL-on-Hadoop query), and/or column pruning (filters on the list of columns projected in the SQL-on-Hadoop query). Processor(s) 215 . . . Processor(s) 221 may receive the instruction in the form of the SQL-on-Hadoop query and these processors may execute the SQL-on-Hadoop query on Processing Backend Cluster 211. Thus, the filtering-during-retrieval may be performed by Output Filter 243 . . . Output Filter 253 on Processing Backend Cluster 211.

Processor(s) 209 may also have to perform some or all filtering required or otherwise needed by the relevancy context data, in addition to the relevancy context parameters that are passed to Processor(s) 215 . . . Processor(s) 221.

Because of this, in some embodiments, Output Filter 233 may have a greatly reduced dataset on which to perform this filtering.

Processor(s) 209 may also format the data corresponding to the data request according to a format specified by the requesting processor (e.g., Processor(s) 203) before returning the data to the requesting processor. The format may be based at least in part on the architecture of the requesting processor. The format may also be based on one or more operations that the requesting processor may be executing at a certain time. For example, the requesting processor may execute one or more operations at the same time and based on the resources available to process the requested data after it is received, the requesting processor may request in addition to the data from Processor(s) 209 that the requested data be formatted to minimize the number of resources necessary for the requesting processor to process the data. In some embodiments, the format of the data may be based on one or more applications being executed by the requesting processor. For example, three applications may be executed on the requesting processor at the same time and may each require or need the data to be formatted in a particular format. Accordingly, Processor(s) 209 may format the data so that the requesting processor may execute the three applications using the requested data in the format necessary for the three applications to be executed.

Processor(s) 209 may also execute one or more other computer-executable instructions stored in Memory 207 to schedule an order in which one or more processes may be executed by Processor(s) 209. This may be referred to as process scheduling (e.g., Process Scheduling 229). The one or more processes may correspond to one or more second computer-executable instructions or may correspond to one or more signals that may be received from another processor (e.g., Processor(s) 203 and/or Processor(s) 215 . . . Processor(s) 221). For example, the one or more first computer-executable instructions may cause Processor(s) 209 to assign a higher priority to a second process corresponding to processing a second request, received from Processor(s) 203, for data stored on Processing Backend Cluster 211, and more particularly for data stored on one or more of Disk Drives 217 . . . Disk Drives 223, than a first process corresponding to processing a signal, received from one or more of Processor(s) 215 . . . Processor(s) 221, including data corresponding to a first request received from Processor(s) 209 for the data. The signal including the data corresponding to the first process may be data that a user device (e.g., User Device 202) may have requested from Processing Backend Cluster 211 in the first request. In this exemplary scenario, Processor(s) 209 may have previously received the first request before the second request, but may process the second request first and process the signal corresponding to the first request second. Processor(s) 215 . . . Processor(s) 221 may process the processes in this order to send the requesting processor (i.e., Processor(s) 209 in this example) the data corresponding to the first and second requests in one data communication signal, thereby reducing the amount of signaling needed to send data intended for the same processor. In some embodiments, Processor(s) 209 may execute processes corresponding to sending the data to Processor(s) 203 in the same order in which the requests for data are received. In other embodiments, Processor(s) 209 may execute processes based at least in part on a priority assigned to a request received from a processor (e.g., Processor(s) 203). For example. Process Scheduling 229 may cause Processor(s) 209 to assign a first priority to a first request for data based at least in part on a first priority indication in a first data communication signal corresponding to the first request and may assign a second priority to a second request for data based at least in part on a second priority indication in a second data communication signal corresponding to the second request wherein the first priority is higher than the second priority. As a result, if the first data communication signal arrives at Processor(s) 209 after the second data communication signal arrives, Processor(s) 209 may process the first data communication signal before it processes the second data communication signal and may send a third data communication signal to Processor(s) 215 . . . Processor(s) 221 to read data corresponding to the first request first, and then may send a fourth data communication signal to Processor(s) 215 . . . Processor(s) 221 to read data corresponding to the second request after the third data communication signal has been sent.

Processor(s) 209 may also perform one or more interrupt handling operations (e.g., Interrupt Handling 241). In some embodiments, Processor(s) 209 may include one or more electrical pins that may be electrically connected to other components in Processing Frontend Server 205 such as Memory 207, a NIC (not shown), or disk drive (not shown), and may receive one or more electrical signals from these components to cause Processor(s) 209 to stop executing a process corresponding to one or more computer-executable instructions or instruction sets that it may be executing and may cause Processor(s) 209 to execute one or more other computer-executable instructions corresponding to the one or more electrical signals. Upon receiving the one or more electrical signals which may include one or more computer-executable instructions, Processor(s) 209 may store the one or more computer-executable instructions in Memory 207, save a state of the stopped process, then execute the one or more computer-executable instructions stored in Memory 207. This type of electrical signal may be referred to as an interrupt. The one or more interrupt handling operations (e.g., Interrupt Handling 241) may be one or more computer-executable instructions that may cause Processor(s) 209 to process the interrupt. For example, Interrupt Handling 241 may cause Processor(s) 209 to send a signal to Processor(s) 215 . . . Processor(s) 221 in response to an interrupt (e.g., a request for data) that may be received from Processor(s) 203 to read the data stored in one or more of Disk Drives 217 . . . Disk Drives 223. If Processor(s) 209 are executing one or more first computer-executable instructions and/or instruction sets when the interrupt is received, Processor(s) 209 may stop executing the one or more first computer-executable instructions and/or instruction sets that it may be executing and may execute one or more second computer-executable instructions and/or instruction sets to process the interrupt.

Processor(s) 209 may perform a filtering operation that may filter data read from Disk Drives 217 . . . Disk Drives 223 before it is sent to Processor(s) 203 in response to a request for data from Disk Drives 217 . . . Disk Drives 223. In some embodiments, Processor(s) 209 may use the operations in Operations 225 to filter the data. In other embodiments, Processor(s) 209 may use one or more other operations not included in Operations 225 to filter the data. Yet in other embodiments, Processor(s) 209 may use a combination of the operations in Operations 225 and the one or more operations not included in Operations 225. The filtering may correspond to one or more computer-executable instructions stored in Memory 207 that may cause Processor(s) 209 to filter data read from Disk Drives 217 . . . Disk Drives 223, and send the filtered data to an intended destination device (e.g., Processor(s) 203). In particular, Memory 207 may store one or more first computer-executable instructions that cause Processor(s) 209 to send a data communication signal (e.g., Internet Protocol packet) out a first NIC, communicatively coupled to Processor(s) 209 via a bus, to a distributed storage device (e.g., Distributed Storage 211) when Processor(s) 209 receive a request for data from the distributed storage device from Processor(s) 203. In particular Processor(s) 209 may send the data communication signal to NICs, communicatively coupled to Processor(s) 215 . . . Processor(s) 221, over one or more data networks (e.g., The Internet, a WAN, MAN, and/or LAN). Processor(s) 203 may execute one or more other computer-executable instructions that cause Processor(s) 209 to read Memory 207 to determine a relevancy context data associated with a first request for data that Processor(s) 209 may have previously received from Processor(s) 203. The relevancy context data may include one or more computer-executable instructions which may cause Processor(s) 209 to send a second request for data to Processor(s) 215 . . . Processor(s) 221 in response to a first request for data received from Processor(s) 203 for data associated with the first request. As an example, Processor(s) 209 may receive a request, from Processor(s) 203, for a portion of sales data for one or more sales transactions within a month of sales transactions not inclusive of the entire month of sales transactions. For instance, an application executing on User Device 202 may audit the number of sales transactions within a given month wherein the total amount of money received by a business exceeds a certain threshold. Data corresponding to the entire month of sales transactions may be stored on a plurality of disks in Disk Drives 217 . . . Disk Drives 223, and Processor(s) 209 may receive a request from Processor(s) 203 for data corresponding to sales transactions within a given month wherein the total amount of money received by the business exceeds a threshold, but is not inclusive of all sales transactions for the month. In other words, Processor(s) 203 may request a subset of all sales data for the entire month. Memory 207 may store computer-executable instructions that may cause a processor to locate a subset of data corresponding to the sales transactions within the given month wherein the total amount of money received by the business exceeds the threshold. The computer-executable instructions may have been stored in Memory 207 based on a previous request for the same subset of data, or it may be based at least in part on another subset of data that may indicate how data and where one or more subsets of data are stored on the disk drives. Processor(s) 203 may send one or more data communication signals including the computer-executable instructions that may cause Processor(s) 209 to request a subset of all sales data stored on Disk Drives 217 . . . Disk Drives 223. In particular, Processor(s) 209 may execute one or more computer-executable instructions that may cause Processor(s) 209 to send a signal to Processor(s) 215 . . . Processor(s) 221 to execute Read Operation 247 on Disk Drives 217 . . . Disk Drives 223 respectively.

Memory 213 . . . Memory 219 may store one or more computer-executable instructions that may cause Processor(s) 215 . . . Processor(s) 221 to execute read commands that may cause a disk controller to read data from a computer-readable media or to execute write commands that may cause the disk controller to write data to the computer-readable media. For example, Processor(s) 215 . . . Processor(s) 221 may execute computer-executable instructions stored in Memory 213 . . . Memory 219 respectively that may cause Processor(s) 215 . . . Processor(s) 221 to read data from Disk Drives 217 . . . Disk Drives 223 respectively or write data to Disk Drives 217 . . . Disk Drives 223 respectively.

Memory 213 . . . Memory 219 may store one or more other computer-executable instructions that may cause Processor(s) 215 . . . Processor(s) 221, to perform Operations 235 . . . Operations 245 respectively. In some embodiments the one or more computer-executable instructions stored in Memory 213 . . . Memory 219 may be different and Processor(s) 215 . . . Processor(s) 221 may not be the same. Thus Operations 235 . . . Operations 245 may be the same as Operations 225, but may be executed in a different way based on the one or more computer-executable instructions and the processors they are executed on.

When Processor(s) 215 . . . Processor(s) 221 receive a request for data from Processor 209, Processor(s) 215 . . . Processor(s) 221 may filter data stored in a table in Disk Drives 217 . . . Disk Drives 223 using push filters, pull filters, and/or prune rows and/or columns of the table thereby reducing the amount of data that may need to be sent back to Processor(s) 209 when data is requested from Processor(s) 215 . . . Processor(s) 221. In some embodiments, Processor(s) 215 . . . Processor(s) 221 may perform results filtering (e.g., horizontal or row filtering) and column filtering (e.g., vertical filtering). Processor(s) 215 . . . Processor(s) 221 also format the filtered data, as explained above: so that Processor(s) 209 does not have to format the data after it is received. The format might be based at least in part on one or more filtering operations that Processor(s) 209 might perform on the filtered data. For example, Processor(s) 215 . . . Processor(s) 221 may execute one or more computer-executable instructions that cause Processor(s) 215 . . . Processor(s) 221 to execute Output Filter 243 . . . Output Filter 253 respectively, wherein Output Filter 243 . . . Output Filter 253 may include push filters and/or pull filters that reduce the number of rows and/or columns that may be returned to Processor(s) 209. For instance, Processor(s) 215 . . . Processor(s) 221 may apply one or more push filters and/or pull filters that may extract a first subset of rows and a first subset of columns. The first subset of rows and first subset of columns may be returned to Processor(s) 209. In some embodiments, Processor(s) 215 . . . Processor(s) 221 may apply the one or more push filters and/or pull filters sending one or more low-latency SQL queries to Disk Drives 221 . . . Disk Drives 223 using a parallel processing SQL query engine (e.g., Cloudera Impala). This may be referred to as pre-filtering. Processor(s) 209 may further filter the first subset or rows and first subset of columns by executing Output Filter 233 on the first subset of rows and the first subset of columns. In some embodiments, Processor(s) 215 . . . Processor(s) 221 may compress the first subset of rows and the first subset of columns by aggregating the first subset of rows and aggregating the first subset of columns in such a way that a receiving processor (e.g., Processor(s) 209) can disaggregate the aggregated first subset of rows and aggregated first subset of columns. This may be done by Processor(s) 215 . . . Processor(s) 221 to reduce the amount of bandwidth used to send the first subset of rows and the first subset of columns to Processor(s) 209, to minimize the amount of space required to store the first subset of rows and the first subset of columns in Processing Frontend Server 205, and minimize the number of processor resources (e.g., clock cycles to execute any of Operations 225) needed to process the requested data. Because only the relevant subsets of data are returned, the number of clock cycles is effectively reduced because Processor(s) 209 will execute Operations 225 on less data. For example. Processor(s) 209 may execute Output Filter 233 on the disaggregated first subset of rows and the disaggregated first subset of columns, and may apply one or more push filters and/or pull filters, and/or may prune the first subset of rows and the first subset of columns. Processor(s) 209 may only return the relevant data to the request from the filtered and/or pruned first subset of rows and first subset of columns to a requesting processor (e.g., Processor(s) 203).

Figure 3:
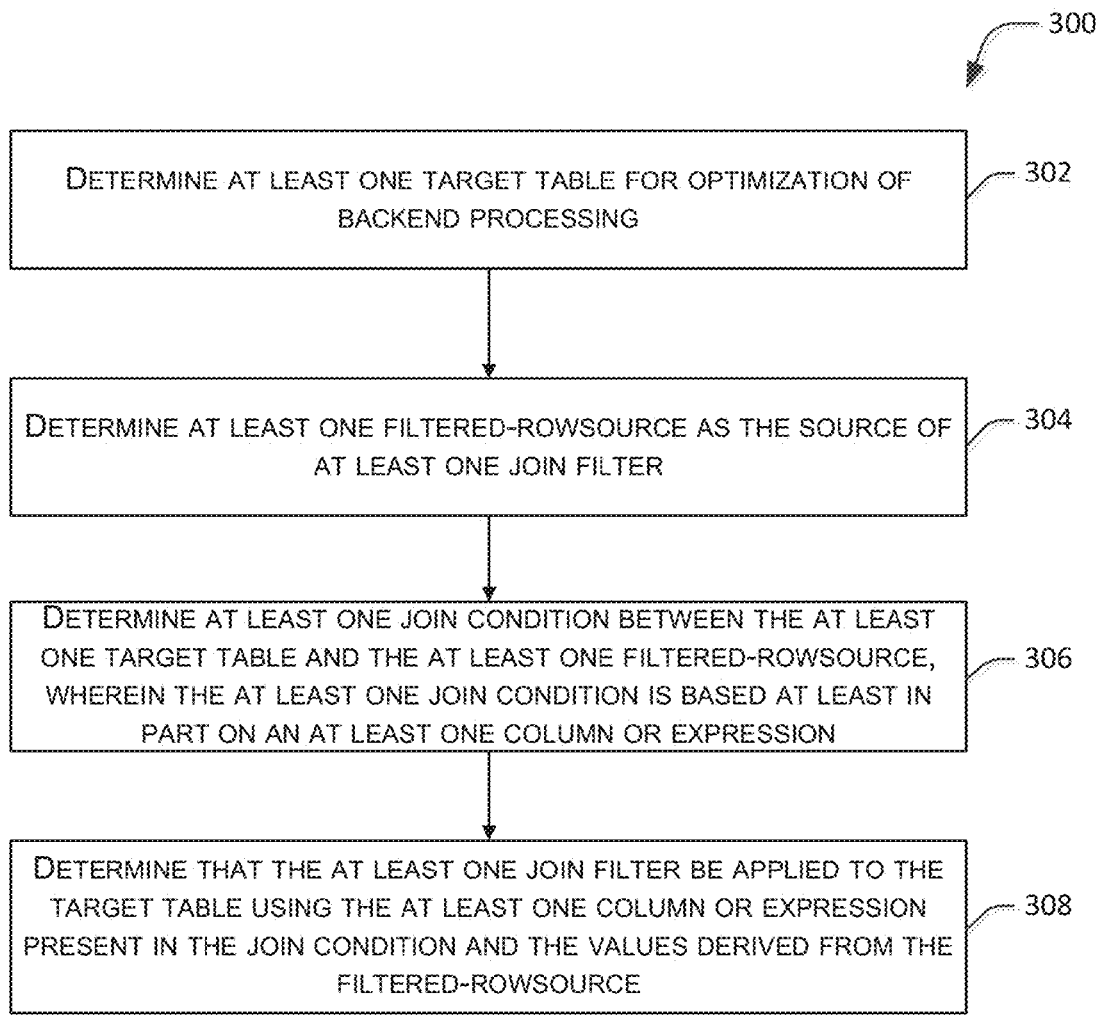
FIG. 3 depicts an illustrative process for filtering a data request in a storage device, in accordance with one or more embodiments of the disclosure.

FIG. 3 depicts an illustrative process for filtering a data request in a storage device, in accordance with one or more embodiments of the disclosure. At least one processor may perform the operations of a process (e.g., Process 300) including one or more blocks that may occur in the same order as shown in FIG. 3 or may occur in another order. The process may begin at block 302, wherein a processing frontend server (e.g., Processing Frontend Server 205) may determine at least one target table for optimization for backend processing. For example, a database on a processing frontend server (e.g., Processing Frontend Server 205), such as an RDBMS, may include a fact table comprising sales data (e.g., SALES_FACT fact table) that has its physical storage, either fully or in part, offloaded to a processing backend cluster (e.g., Processing Backend Cluster 211) such as Hadoop. The fact table may include facts or measures and links to other tables such as dimension tables.

In some embodiments, the SALES_FACT fact table may include at least two rows and two columns containing data associated with the sales of different products (e.g., clothing items, entertainment items, financial products, etc.). The SALES_FACT fact table may also include dimensions such as links (keys) to the names of entities associated with selling the different products, the names of customers (e.g., a person or a corporate entity) receiving the different products. In some embodiments, the SALES_FACT fact table may include information associated with the prices of the different products. In some embodiments, the SALES_FACT fact table may also include data associated with the point of origin (e.g., a first address associated with where the different products were made or where it was shipped from) of the different products and point of delivery of the products (e.g., a second address associated with where the different products are delivered to).

After block 302 the process may progress to block 304, where the processing frontend server may determine at least one filtered-rowsource as the source of at least one join filter. The at least one filtered-rowsource may be a dimension table. The dimension table may be a data structure that categorizes facts and/or measurements in the target table. In particular, the dimension table may include foreign keys which may refer to candidate keys. The foreign keys may be a field, or collection of fields, in one table that uniquely identifies a row of another table. For example, a first table called EMPLOYEE may have a primary key called EMPLOYEE_ID, and a second table called EMPLOYEE_DETAILS may have a foreign key which references EMPLOYEE_ID in order to uniquely identify the relationship between the first table and the second table. The candidate keys may correspond to a set of attributes such that a relation, between a tuple and an attribute in the target table, does not have two distinct tuples with the same values for the attributes, and there is no subset of the attributes such that two distinct tuples have the same values for the attribute. That is, the set of attributes such that the relation holds is minimal. The dimension table may contain descriptive attributes that may be textual fields. The attributes may enable querying of constraints and/or filters, and query result set labeling.

At block 306 the processing frontend server may determine at least one join condition between the at least one target table and the at least one filtered-rowsource, wherein the at least one join condition is based at least in part on an at least one column or expression. For example, a join condition between the target table and the dimension table may be based at least in part on a column, and the at least one join filter of the dimension table may be expressed as a predicate on the column of the join condition on the target table.

At block 308, the processing frontend server may determine that the at least one join filter can be transformed to a predicate to be applied to the target table using the at least one column or expression present in the join condition and the values for the corresponding column or expression derived from the filtered-rowsource.

The following is an example of what an outcome might be from illustrative process 300 depicted by FIG. 3. Suppose a hybrid query of the following form is executed on the processing frontend server:

```
SELECT [...columns...]
FROM WAREHOUSE.SALES_FACT
    INNER JOIN
    WAREHOUSE.PRODUCTS_DIM
    ON SALES_FACT.PRODUCT_ID =
    PRODUCTS_DIM.PRODUCT_ID
WHERE PRODUCTS_DIM.PRODUCT_CLASS = 'Household'
```

This example is presented in a simple pseudo-SQL style for illustrative purposes. In this example, WAREHOUSE.SALES_FACT may be a logical representation of the backend-processed target table determined by block 302 and WAREHOUSE.PRODUCTS_DIM may be the filtered-rowsource determined at block 304. In some embodiments, the processing frontend server may generate an additional predicate or set of predicates, at block 308, which may be generated from the filtered-rowsource and appended to a backend-processed SQL statement as illustrated by the pseudo-SQL below:

```
SELECT [...columns...]
FROM WAREHOUSE.SALES_FACT
WHERE PRODUCT_ID IN (51, 52, 53, 54, 55)
```

In this example, the backend-processed target table (WAREHOUSE.SALES_FACT) may have the same database/schema name (WAREHOUSE) and table name (SALES_FACT) as its logical representation in the hybrid query executing on the processing frontend server. In some embodiments, the name of the backend-processed target table database or schema name and backend-processed target table name may be different to the associated database or schema name and table name in the processing frontend server.

The structure and format of the predicates generated in block 308 might depend in part on the at least one column determined from the join condition identified in block 306, in part on which of the adaptive processing flows (illustrated in FIG. 6, 7, 8, 9, 10, 11) is executed and in part on the processing backend cluster technology.

Figure 4:
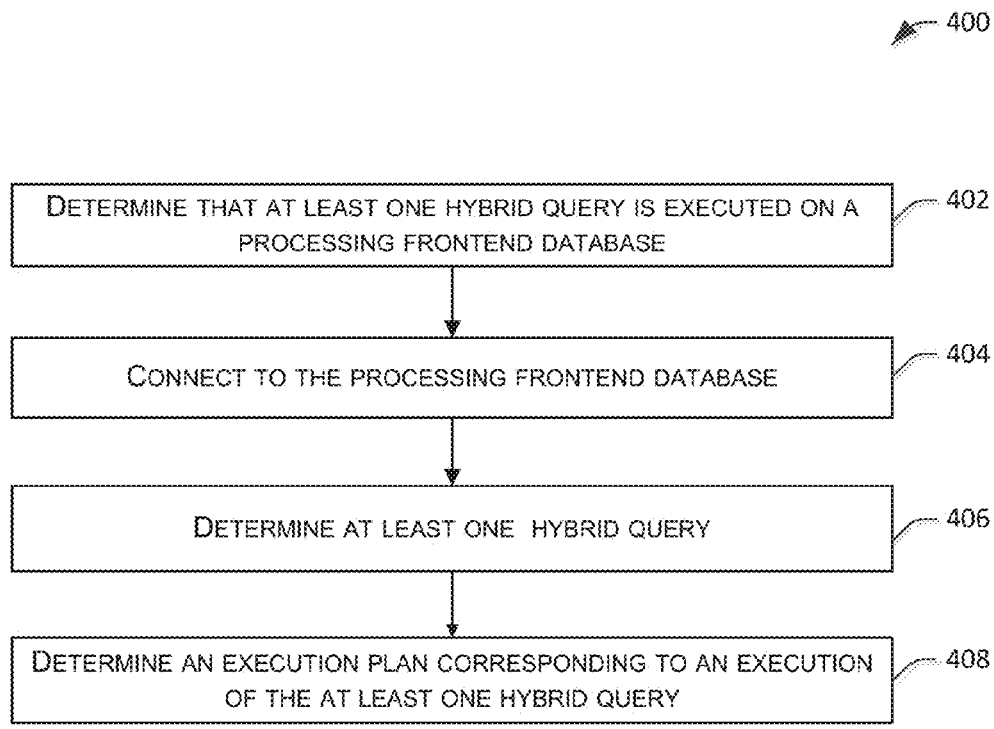
FIG. 4 depicts an illustrative process of executing a query for data in a storage device, in accordance with one or more embodiments of the disclosure.

FIG. 4 depicts an illustrative process of executing a hybrid query for data in multiple storage devices, in accordance with one or more embodiments of the disclosure. At least one processor may perform the operations of a process (e.g., Process 400) including one or more blocks that may occur in the same order as shown in FIG. 4 or may occur in another order. The process may begin at block 402, wherein the processing frontend server may determine that at least one hybrid query is executed on a processing frontend database. For example, the at least one hybrid query may perform an analysis of sales over time for a limited set of products or locations, wherein the more recent sales data resides in the processing frontend database (a database on the processing frontend server) into which it was initially loaded, but the more historical (e.g., older) data resides in a processing backend cluster due to this data having been offloaded from the processing frontend database to the processing backend cluster. After determining that a hybrid query is being executed, the processing frontend server may connect to the processing frontend database in block 404. At block 406, the processing frontend server may determine at least one query structure of the at least one hybrid query executing in the processing frontend database. At block 408, the processing backend cluster may determine an execution plan corresponding to an execution of the at least one hybrid query.

Figure 5:
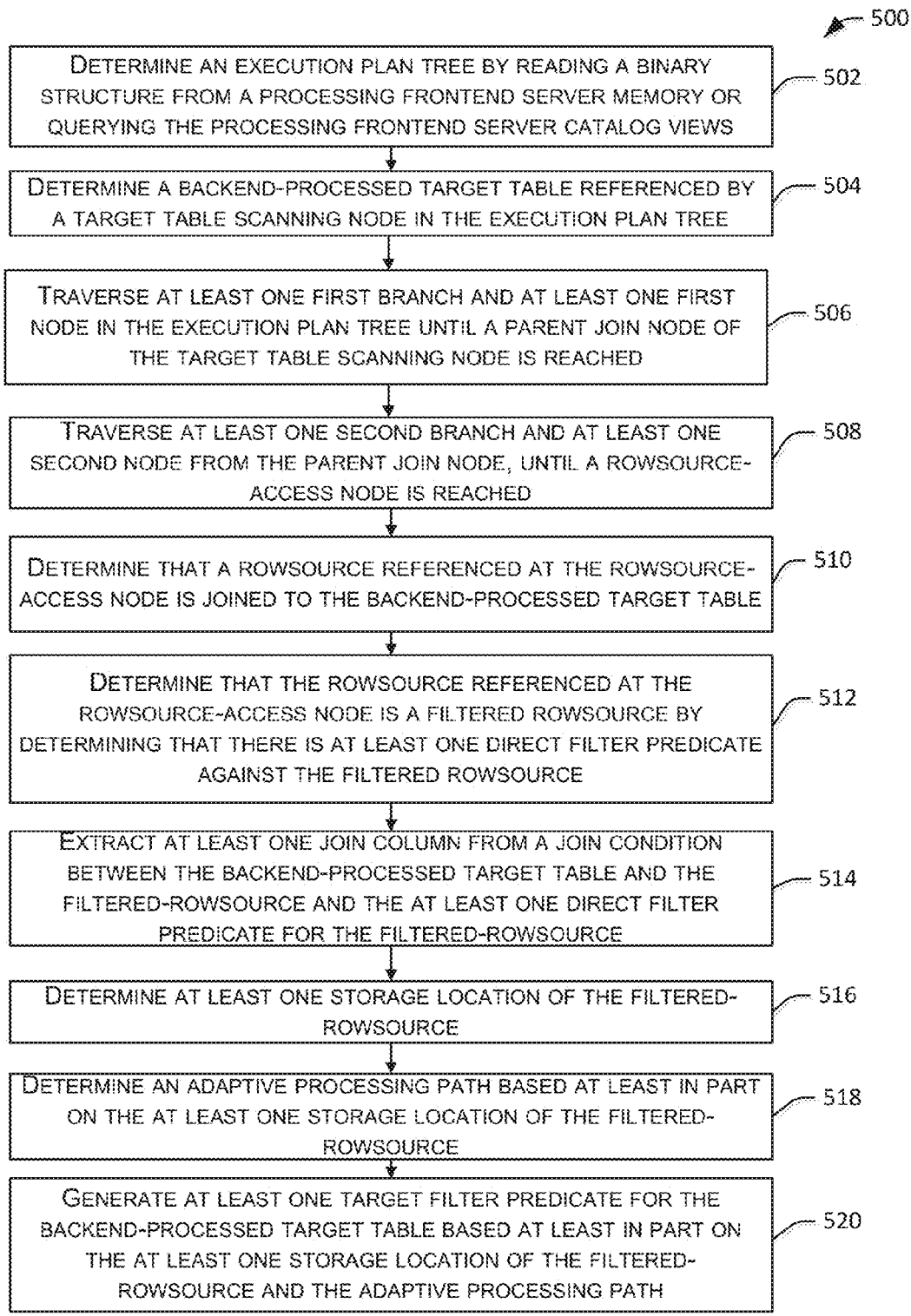
FIG. 5 depicts an illustrative process of generating a filter predicate for data in a storage device, in accordance with one or more embodiments of the disclosure.

FIG. 5 depicts an illustrative process of generating a filter predicate for data in a storage device, in accordance with one or more embodiments of the disclosure. At least one processor may perform the operations of a process (e.g., Process 500) including one or more blocks that may occur in the same order as shown in FIG. 5 or may occur in another order. The process may begin at block 502, the processing frontend server may determine an execution plan tree by reading a binary structure (e.g., one or more computer-executable instructions) from a processing frontend server memory or querying the processing frontend database catalog views. An execution plan may include the operations used to execute a statement. For example, there may be one or more computer-executable instructions stored in a memory, corresponding to a select statement, that when executed by a processor may cause the processor to select data from a database. In particular, the one or more computer-executable instructions may correspond to an execution plan to select the data from the database. The one or more computer-executable instructions may be expressed as a set of database operators that consume and produce rows. The order of the operators and their implementations may be determined based at least in part on a query optimizer that may use a combination of query transformations and physical optimization techniques.

The execution plan may correspond to an execution plan tree in which the processor may execute the one or more computer-executable instructions corresponding to the operations in the execution plan tree which are expressed as leaves or nodes on the execution plan tree. For instance, an execution plan tree may include a root node directly connected to a branching node via a first branch, and the branching node may be connected to a first leaf via a second branch extending to the left of the branching node and the branching node may be connected to a second leaf via a third branch that extends to the right of the branching node. As an example, the processor may execute the one or more computer-executable instructions that cause the processor to execute the operations of scanning the first leaf and second leaf. The first leaf and second leaf may correspond to a first table and second table respectively, in which case the processor may perform a table scan of the first table and the second table and one or more extract rows from the first table and the second table. The rows may be consumed by the branching node. For instance, the branching node may be a join operator, which may cause the processor to join or consume the resulting table scans of the first table and the second table. For example, the join operator may be a hash-join, or alternatively include nested-loop or sort-merge joins. Accordingly, the processor may consume the resulting table scan of the first table and the resulting table scan of the second table using a hash-join. The root node may consume rows produced as a result of the hash-join, and may consume the rows using a hash.

In some embodiments the processor may query the processing frontend server catalog views to determine an execution plan corresponding to the execution of a hybrid query. The processing frontend server catalog views may include additional metadata about the objects referenced in the execution plan. The metadata may include information about the physical and/or logical structure of the query objects in the processing frontend server.

At block 504, the processing frontend server may determine a backend-processed target table referenced by a table-scanning node in the execution plan tree. For example, a database on a processing frontend server (e.g., Processing Frontend Server 205), such as an RDBMS, may include a fact table comprising sales data (e.g., SALES_FACT fact table) that has its physical storage, either fully or in part, offloaded to a processing backend cluster (e.g., Processing Backend Cluster 211) such as Hadoop. The fact table may include facts or measures and links to other tables such as dimension tables. In some embodiments, the SALES_FACT fact table may include at least two rows and two columns containing data associated with the sales of different products (e.g., clothing items, entertainment items, financial institution data, etc.). The SALES_FACT fact table may also include dimensions such as links (keys) to the names of entities associated with selling the different products, the names of customers (e.g., a person or a corporate entity) receiving the different products. In some embodiments, the SALES_FACT fact table may include information associated with the prices of the different products. In some embodiments, the SALES_FACT fact table may also include data associated with the point of origin (e.g., a first address associated with where the different products were made or where it was shipped from) of the different products and point of delivery of the products (e.g., a second address associated with where the different products are delivered to).

At block 506, a processor in the processing frontend server may traverse at least one first branch and at least one first node in the execution plan tree until a parent join node of the target table scanning node is reached. For example, the processor may traverse the second branch (e.g., at least one first branch) connecting the first leaf (e.g., the first node) to the branching node (e.g., parent join node) of the execution plan tree.

At block 508, the processor may traverse at least one second branch and at least one second node from the parent join node until a rowsource-access node is reached. For example, the processor may traverse the first branch (e.g., at least one second branch) connecting the branching node (e.g., first node) to the root node (e.g., rowsource-access node).

At block 510, the processor may determine that a rowsource referenced at the rowsource-access node is joined to the backend-processed target table. The rowsource may call child rowsource functions in the execution plan tree, fetch rows returned from the child rowsources (functions), process the returned rows, and pass the returned rows up the tree to parent rowsources. As an example, the processor may determine that the rowsource is joined to the backend-processed target table at the root node.

At block 512, the processor may determine that the rowsource referenced at the rowsource-access node is a filtered-rowsource by determining that there is at least one direct filter predicate against the filtered-rowsource.

At block 514, the processor may extract at least one join column from a join condition between the backend-processed target table and the filtered-rowsource and the at least one direct filter predicate for the filtered-rowsource.

At block 516, the processor may determine at least one storage location of the filtered-rowsource. The at least one storage location of the filtered-rowsource may be the processing frontend (e.g., Network Attached Storage Server 137 connected to Processing Frontend Server 205), one or more disk drives (e.g., Disk Drives 217 . . . Disk Drives 223) on the processing backend cluster (e.g., Processing Backend Cluster 211) or a combination of both.

At block 518, the processor may determine an adaptive processing path based at least in part on the at least one storage location of the filtered-rowsource.

In some embodiments, the at least one storage location of the filtered-rowsource may be the processing frontend, and the processor may execute computer-executable instructions corresponding to block 602, as explained below with reference to FIG. 6. In other embodiments, the at least one storage location of the filtered-rowsource may be the processing frontend, and the processor may execute computer-executable instructions corresponding to block 702, as explained below with reference to FIG. 7. Yet still in other embodiments, the at least one storage location of the filtered-rowsource may be the processing frontend, and the processor may execute computer-executable instructions corresponding to block 802, as explained below with reference to FIG. 8. Further still in other embodiments, the at least one storage location of the filtered-rowsource may be the processing frontend, and the processor may execute computer-executable instructions corresponding to block 902, as explained below with reference to FIG. 9. In some embodiments, the at least one storage location of the filtered-rowsource may be the processing backend cluster, and the processor may execute computer-executable instructions corresponding to block 1002, as explained below with reference to FIG. 10. Yet still in other embodiments, the at least one storage location of the filtered-rowsource may be the processing frontend and/or the processing backend cluster, and the processor may proceed to execute computer-executable instructions corresponding to block 1102, as explained below with reference to FIG. 11.

Referring to FIG. 5, at block 520, the processor may generate at least one target filter predicate for the backend-processed target table based at least in part on the at least one storage location of the filtered-rowsource and the results of the adaptive processing path taken through processes 600, 700, 800, 900, 1000.

The following is an example of what an outcome might be from illustrative process 500 depicted by FIG. 5. Suppose a hybrid query of the following form is executed on the processing frontend server:

```
SELECT [...columns...]
FROM WAREHOUSE.SALES_FACT
```

```
INNER JOIN
    WAREHOUSE.PRODUCTS_DIM
    ON SALES_FACT.PRODUCT_ID =
    PRODUCTS_DIM.PRODUCT_ID
WHERE PRODUCTS_DIM.PRODUCT_CLASS = 'Household'
```

This example is presented in a simplified pseudo-SQL style for illustrative purposes. In this example, WAREHOUSE.SALES_FACT may be a logical representation of the backend-processed target table determined by block 504 and WAREHOUSE.PRODUCTS_DIM may be the filtered-rowsource determined through blocks 508, 510, 512. In some embodiments, a possible outcome of block 520 may be an additional predicate or set of predicates, generated from the filtered-rowsource and appended to a backend-processed SQL statement as illustrated by the pseudo-SQL below:

```
SELECT [...columns...]
FROM WAREHOUSE.SALES_FACT
WHERE.PRODUCT_ID IN (51, 52, 53, 54, 55)
```

In this example, the backend-processed target table (WAREHOUSE.SALES_FACT) has the same database/schema name (WAREHOUSE) and table name (SALES_FACT) as its logical representation in the hybrid query executing on the processing frontend server. In some embodiments, the name of the backend-processed target table database or schema name and backend-processed target table name may be different to the associated database or schema name and table name in the processing frontend server.

The structure and format of the predicates generated through block 520 might depend in part on the at least one column determined from the join condition identified in block 514, in part on which of the adaptive processing flows (illustrated in FIG. 6, 7, 8, 9, 10, 11) is determined by block 518 and in part on the processing backend cluster technology.

Figure 6:
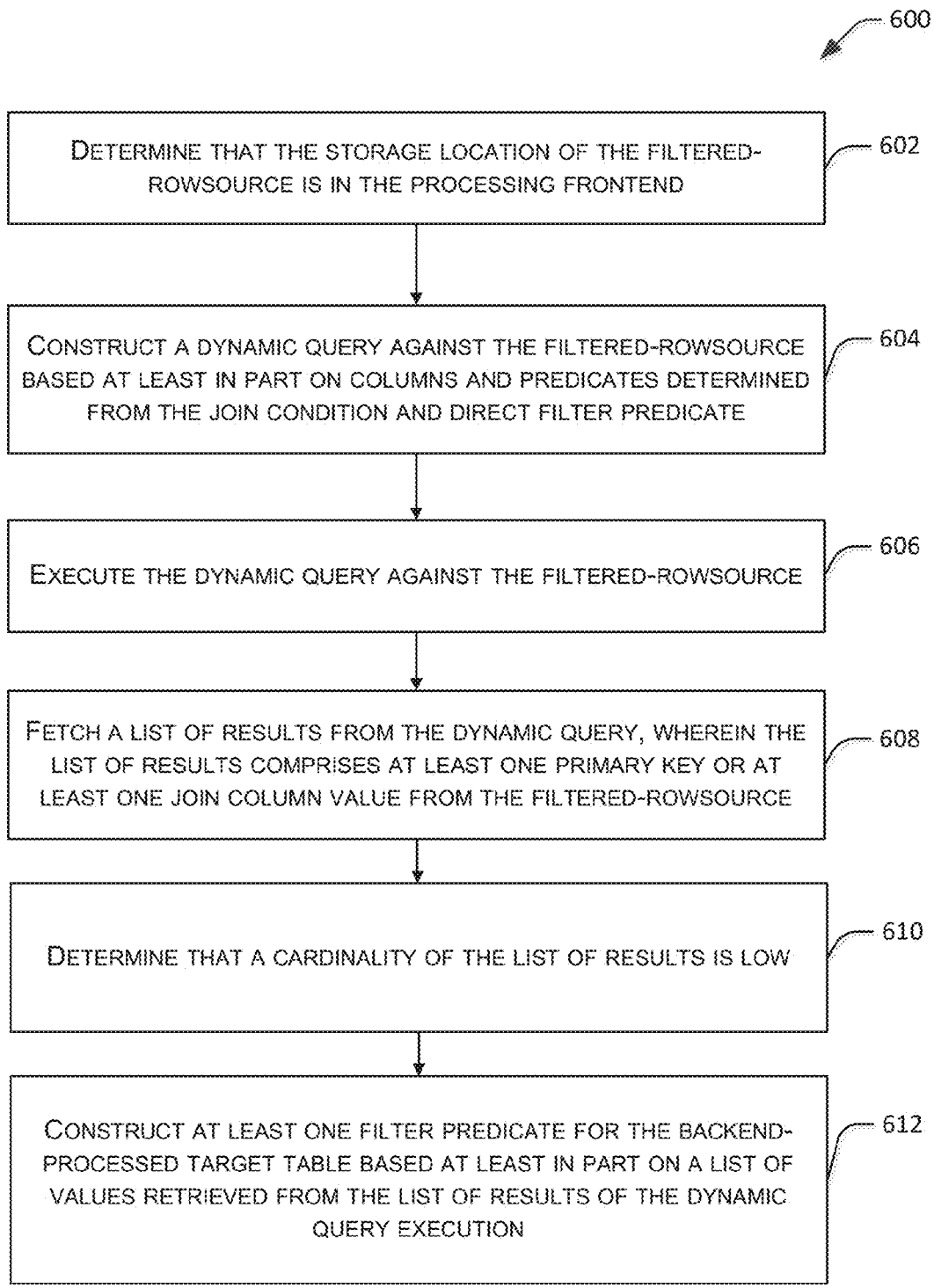
FIG. 6 depicts an illustrative process constructing a filter predicate for data in a storage device, in accordance with one or more embodiments of the disclosure.

FIG. 6 depicts an illustrative process constructing a filter predicate for data in a storage device, in accordance with one or more embodiments of the disclosure. At block 602, the processor may determine that the storage location of the filtered-rowsource is in the processing frontend, and may construct a dynamic query against the filtered-rowsource based at least in part on columns and predicates determined from the join condition between the backend-processed target table and the filtered-rowsource and the direct filter predicate(s) on the filtered-rowsource (block 604). At block 606, the processor may execute the dynamic query against the filtered-rowsource. At block 608, the processor may fetch a list of results from the dynamic query, wherein the list of results may include at least one primary key or at least one join column value from the filtered-rowsource. At block 610, the processor may determine that a cardinality of the list of results is low. For example, the processor may determine the size (e.g., number) of items or entries in the list to be below a certain threshold, and may categorize the list as low-cardinality. At block 612, the processor may construct at least one filter predicate for the backend-processed target table based at least in part on a list of values retrieved from the list of results of the dynamic query execution.

The following is an example of what an outcome might be from illustrative process 600 depicted by FIG. 6. Suppose a hybrid query of the following form is executed on the processing frontend server:

```
SELECT [...columns...]
    FROM WAREHOUSE.SALES_FACT
        INNER JOIN
        WAREHOUSE.PRODUCTS_DIM
        ON SALES_FACT.PRODUCT_ID =
        PRODUCTS_DIM.PRODUCT_ID
    WHERE PRODUCTS_DIM.PRODUCT_CLASS = 'Household'
```

This example is presented in a simplified pseudo-SQL style for illustrative purposes. In this example, WAREHOUSE.SALES_FACT may be a logical representation of the backend-processed target table and WAREHOUSE.PRODUCTS_DIM may be the filtered-rowsource present in the processing frontend server, as determined at block 602. In some embodiments, a possible outcome of block 612 may be an additional predicate or set of predicates, generated from the filtered-rowsource and appended to a backend-processed SQL statement as illustrated by the pseudo-SQL below:

```
SELECT [...columns...]
    FROM WAREHOUSE.SALES_FACT
    WHERE PRODUCT_ID IN (51, 52, 53, 54, 55)
```

In this example, the backend-processed target table (WAREHOUSE.SALES_FACT) has the same database/schema name (WAREHOUSE) and table name (SALES_FACT) as its logical representation in the hybrid query executing on the processing frontend server. In some embodiments, the name of the backend-processed target table database or schema name and backend-processed target table name may be different to the associated database or schema name and table name in the processing frontend server.

The structure and format of the predicates generated through block 612 might depend in part on the at least one column determined from the join condition identified in block 604, in part on the cardinality of the list of results determined through blocks 606, 608 and 610 and in part on the processing backend cluster technology.

Figure 7:
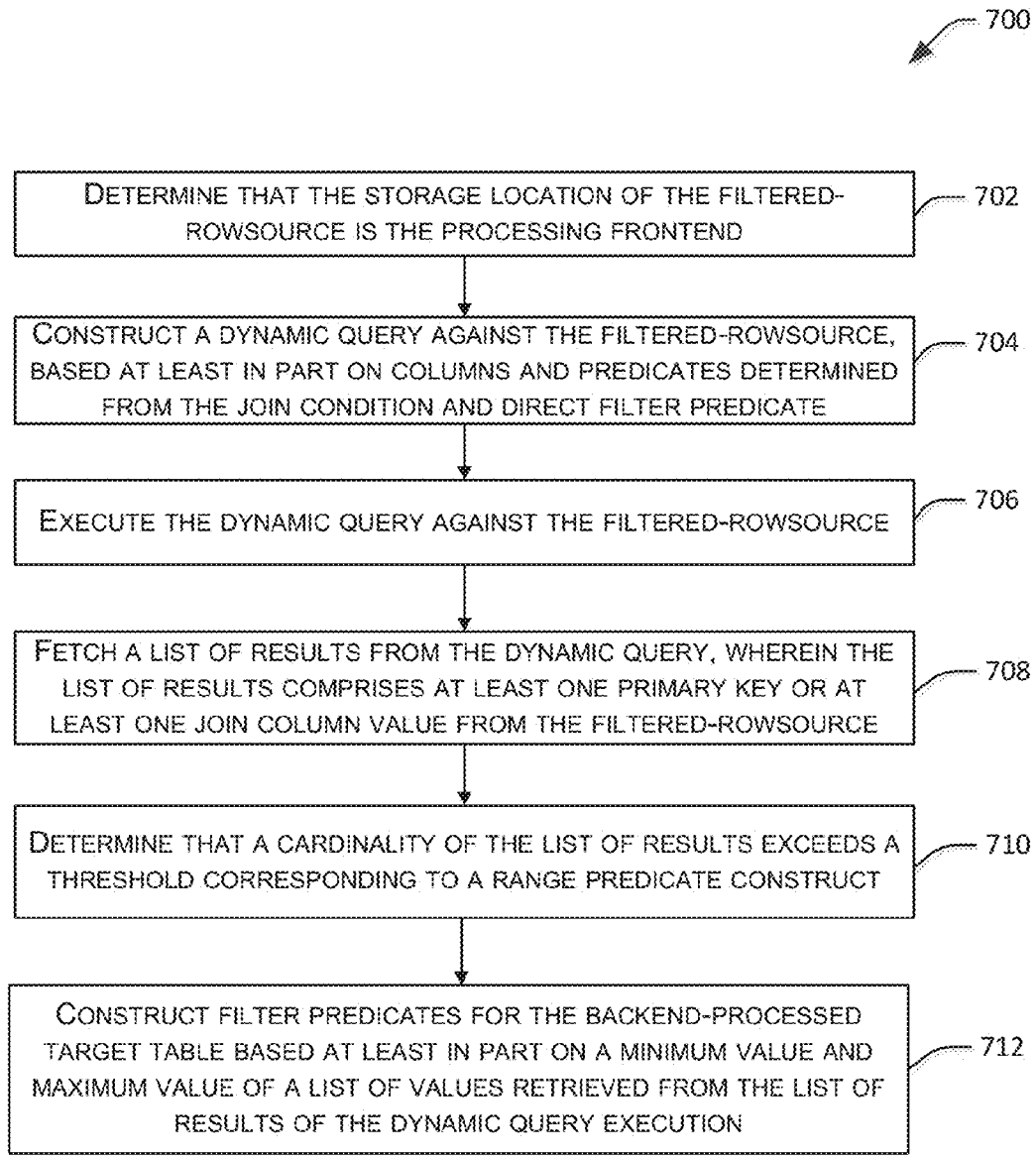
FIG. 7 depicts an illustrative process constructing a filter predicate for data in a storage device, in accordance with one or more embodiments of the disclosure.

FIG. 7 depicts an illustrative process constructing a filter predicate for data in a storage device, in accordance with one or more embodiments of the disclosure. At block 702, the processor may determine that the storage location of the filtered-rowsource is in the processing frontend, and may construct a dynamic query against the filtered-rowsource based at least in part on columns and predicates determined from the join condition between the backend-processed target table and the filtered-rowsource and the direct filter predicate(s) on the filtered-rowsource (block 704). At block 706, the processor may execute the dynamic query against the filtered-rowsource. At block 708, the processor may fetch a list of results from the dynamic query, wherein the list of results includes at least one primary key or at least one join column value from the filtered-rowsource. At block 710, the processor may determine that the cardinality of the list of results exceeds a threshold that classifies it as high-cardinality and optimal for a predicate in the form of a range predicate construct. At block 712, the processor may construct filter predicates for the backend-processed target table based at least in part on a minimum value and maximum value of a list of values retrieved from the list of results of the dynamic query execution.

The following is an example of what an outcome might be from illustrative process 700 depicted by FIG. 7. Suppose a hybrid query of the following form is executed on the processing frontend server:

```
SELECT [...columns...]
    FROM WAREHOUSE.SALES_FACT
        INNER JOIN
        WAREHOUSE.PRODUCTS_DIM
        ON SALES_FACT.PRODUCT_ID =
        PRODUCTS_DIM.PRODUCT_ID
    WHERE PRODUCTS_DIM.PRODUCT_CLASS = 'Books'
```

This example is presented in a simplified pseudo-SQL style for illustrative purposes. In this example, WAREHOUSE.SALES_FACT may be a logical representation of the backend-processed target table and WAREHOUSE.PRODUCTS_DIM may be the filtered-rowsource present in the processing frontend server, as determined at block 702. In some embodiments, a possible outcome of block 712 may be an additional predicate or set of predicates, generated from the filtered-rowsource and appended to a backend-processed SQL statement as illustrated by the pseudo-SQL below:

```
SELECT [...columns...]
    FROM WAREHOUSE.SALES_FACT
    WHERE PRODUCT_ID>=10051 AND PRODUCT_ID<=20055
```

In this example, the backend-processed target table (WAREHOUSE.SALES_FACT) may have the same database/schema name (WAREHOUSE) and table name (SALES_FACT) as its logical representation in the hybrid query executing on the processing frontend server. In some embodiments, the name of the backend-processed target table database or schema name and backend-processed target table name may be different to the associated database or schema name and table name in the processing frontend server.

The structure and format of the predicates generated through block 712 might depend in part on the at least one column determined from the join condition identified in block 704, in part on the cardinality of the list of results determined through blocks 706, 708 and 710 and in part on the processing backend cluster technology.

Figure 8:
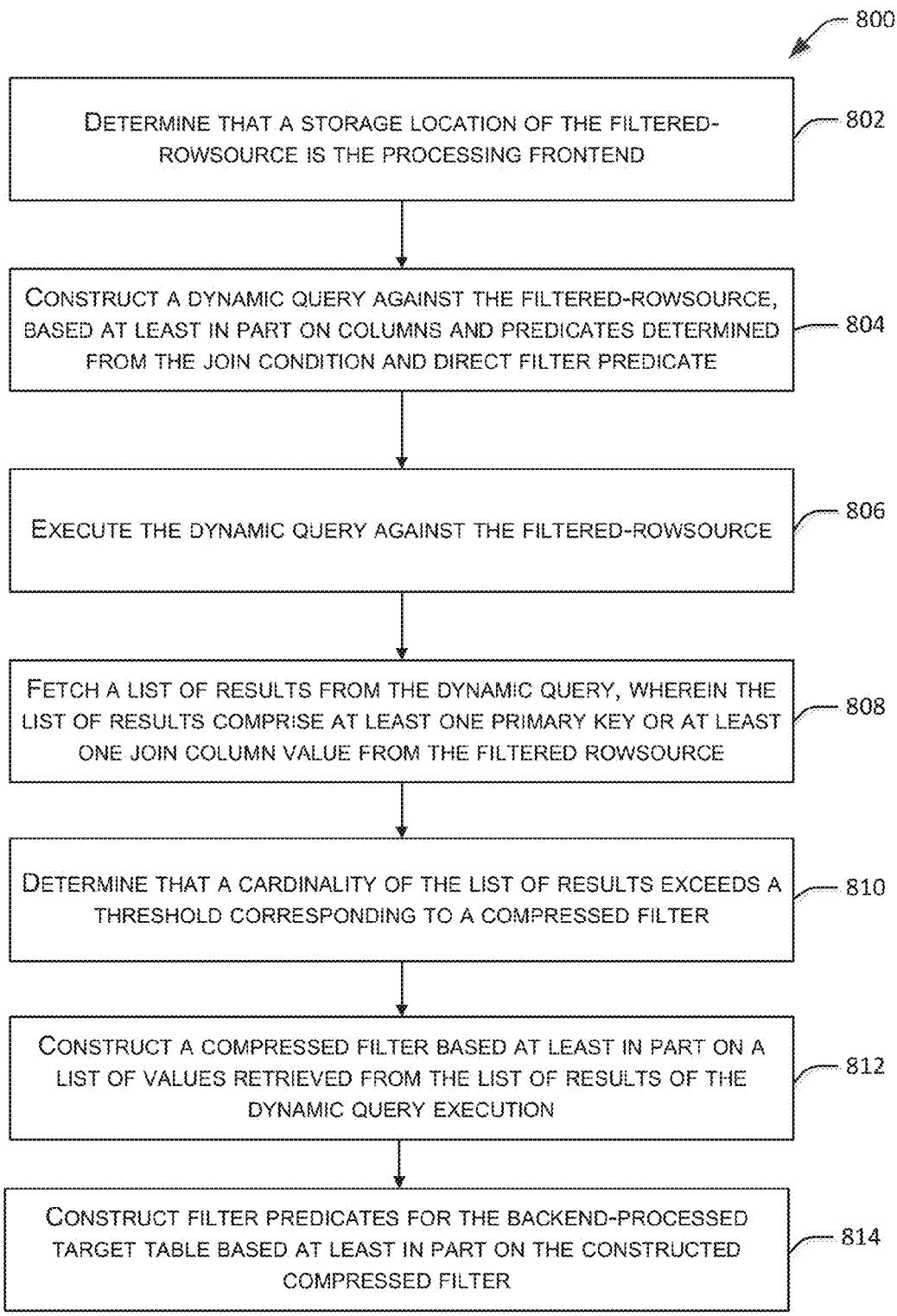
FIG. 8 depicts an illustrative process constructing a filter predicate for data in a storage device, in accordance with one or more embodiments of the disclosure.

FIG. 8 depicts an illustrative process constructing a filter predicate for data in a storage device, in accordance with one or more embodiments of the disclosure. At block 802, the processor may determine that the storage location of the filtered-rowsource is the processing frontend. At block 804, the processor may construct a dynamic query against the filtered-rowsource, based at least in part on columns and predicates determined from the join condition between the backend-processed target table and the filtered-rowsource and the direct filter predicate(s) on the filtered-rowsource. At block 806, the processor may execute the dynamic query against the filtered-rowsource. At block 808, the processor may fetch a list of results from the dynamic query, wherein the list of results includes at least one primary key or at least one join column value from the filtered-rowsource. At block 810, the processor may determine that a cardinality of the list of results exceeds a threshold that classifies it as high-cardinality and suited to the generation of a compressed filter and a predicate of the form that can exploit such a compressed filter. At block 812, the processor may construct a compressed filter based at least in part on a list of values retrieved from the list of results of the dynamic query execution. The constructed filter may take one of several forms, such as a probabilistic Bloom or Cuckoo filter, or a complex structure such as a hash table or sorted B-tree index. At block 814, the processor may construct filter predicates for the backend-processed target table based at least in part on the constructed compressed filter.

The following is an example of what an outcome might be from illustrative process 800 depicted by FIG. 8. Suppose a hybrid query of the following form is executed on the processing frontend server:

```
SELECT [...columns...]
    FROM WAREHOUSE.SALES_FACT
        INNER JOIN
        WAREHOUSE.PRODUCTS_DIM
        ON SALES_FACT.PRODUCT_ID =
        PRODUCTS_DIM.PRODUCT_ID
    WHERE PRODUCTS_DIM.PRODUCT_CLASS = 'Books'
```

This example is presented in a simplified pseudo-SQL style for illustrative purposes. In this example, WAREHOUSE.SALES_FACT may be a logical representation of the backend-processed target table and WAREHOUSE.PRODUCTS_DIM may be the filtered-rowsource present in the processing frontend server, as determined at block 802. In some embodiments, a possible outcome of block 814 may be an additional predicate or set of predicates, generated from the filtered-rowsource and appended to a backend-processed SQL statement as illustrated by the pseudo-SQL below:

```
SELECT [...columns...]
    FROM WAREHOUSE.SALES_FACT
    WHERE GLUENT_FILTER(COMPRESSED_FILTER,
        PRODUCT_ID) > 0
```

In this example, the backend-processed target table (WAREHOUSE.SALES_FACT) may have the same database/schema name (WAREHOUSE) and table name (SALES_FACT) as its logical representation in the hybrid query executing on the processing frontend server. In some embodiments, the name of the backend-processed target table database or schema name and backend-processed target table name may be different to the associated database or schema name and table name in the processing frontend server.

The structure and format of the predicates generated through block 814 might depend in part on the at least one column determined from the join condition identified in block 804, in part on the cardinality of the list of results determined through blocks 806, 808 and 810, in part on the type of compressed filter constructed in block 812 and in part on the processing backend cluster technology.

Figure 9:
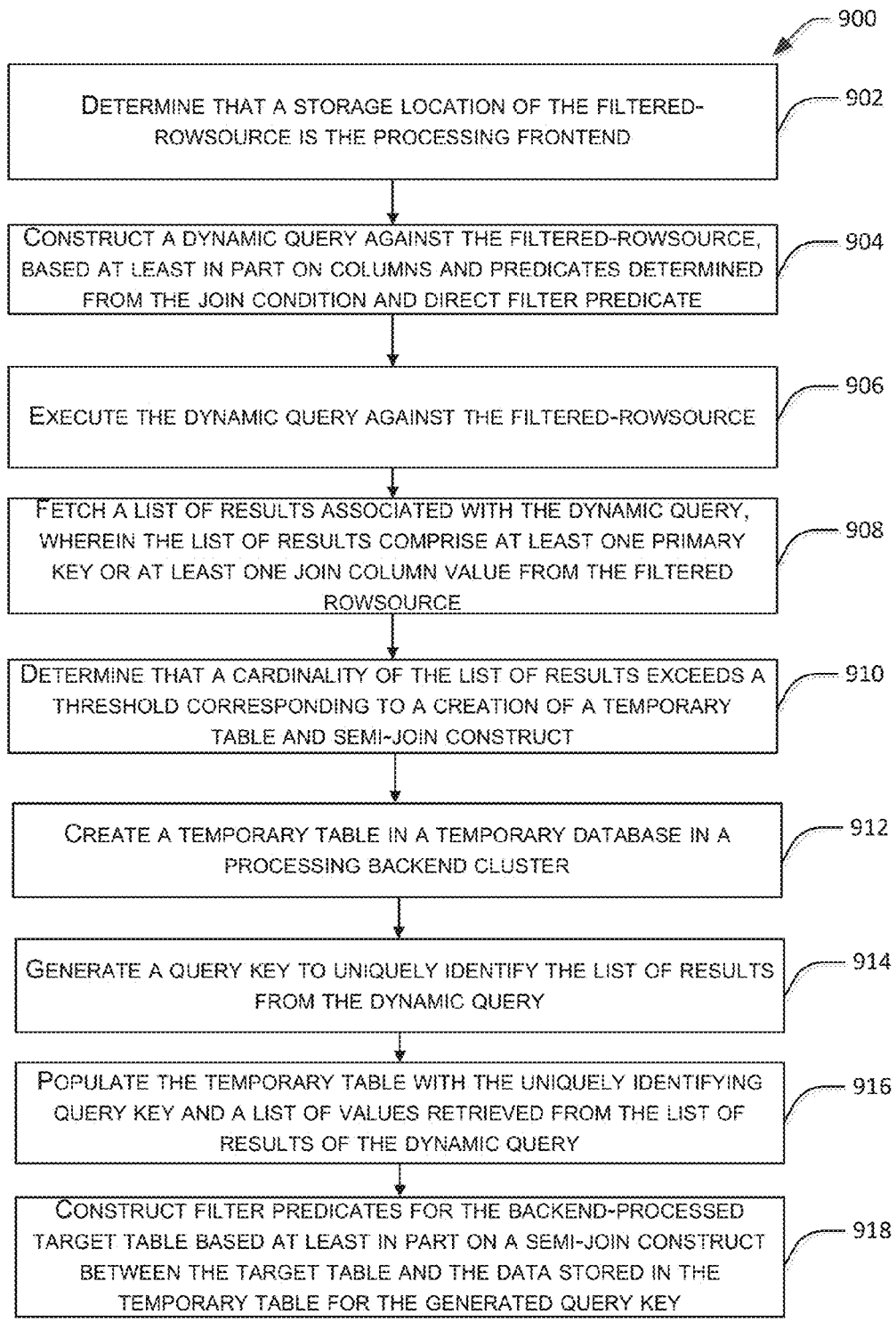
FIG. 9 depicts an illustrative process constructing a filter predicate for data in a storage device, in accordance with one or more embodiments of the disclosure.

FIG. 9 depicts an illustrative process constructing a filter predicate for data in a storage device, in accordance with one or more embodiments of the disclosure. At block 902, the processor may determine that a storage location of the filtered-rowsource is the processing frontend. At block 904, the processor may construct a dynamic query against the filtered-rowsource, based at least in part on columns and predicates determined from the join condition between the backend-processed target table and the filtered-rowsource and the direct filter predicate(s) on the filtered-rowsource. At block 906, the processor may execute the dynamic query against the filtered-rowsource. At block 908, the processor may fetch a list of results associated with the dynamic query, wherein the list of results includes at least one primary key or at least one join column value from the filtered-rowsource. At block 910, the processor may determine that a cardinality of the list of results exceeds a threshold that classifies it as high-cardinality and optimal for the creation of a temporary table of results in the processing backend cluster and the generation of a predicate involving a semi-join construct and a subquery of the temporary table. This allows the processing backend cluster to filter the target table efficiently with a local semi-join type operator. At block 912, the processor may create a temporary table in a temporary database in a processing backend cluster. At block 914, the processor may generate a query key to uniquely identify the list of results of the dynamic query. At block 916, the processor may populate the temporary table with the uniquely identifying query key and a list of values retrieved from the list of results of the dynamic query. At block 918, the processor may construct filter predicates for the backend-processed target table based at least in part on a semi-join construct between the target table and the data stored in the temporary table for the generated query key.

The following is an example of what an outcome might be from illustrative process 900 depicted by FIG. 9. Suppose a hybrid query of the following form is executed on the processing frontend server:

```
SELECT [...columns...]
    FROM WAREHOUSE.SALES_FACT
        INNER JOIN
        WAREHOUSE.PRODUCTS_DIM
        ON SALES_FACT.PRODUCT_ID =
        PRODUCTS_DIM.PRODUCT_ID
    WHERE PRODUCTS_DIM.PRODUCT_CLASS = 'Books'
```

This example is presented in a simplified pseudo-SQL style for illustrative purposes. In this example, WAREHOUSE.SALES_FACT may be a logical representation of the backend-processed target table and WAREHOUSE.PRODUCTS_DIM may be the filtered-rowsource present in the processing frontend server, as determined at block 902. In some embodiments, a possible outcome of block 918 may be an additional predicate or set of predicates, generated from the filtered-rowsource and appended to a backend-processed SQL statement as illustrated by the pseudo-SQL below:

```
SELECT [...columns...]
    FROM WAREHOUSE.SALES_FACT
    WHERE PRODUCT_ID IN (
        SELECT FILTER_KEYS.KEY_VALUE
        FROM TEMP_DB.FILTER_KEYS
        WHERE FILTER_KEYS.QUERY_ID=1234567890)
```

In this example, the backend-processed target table (WAREHOUSE.SALES_FACT) may have the same database/schema name (WAREHOUSE) and table name (SALES_FACT) as its logical representation in the hybrid query executing on the processing frontend server. In some embodiments, the name of the backend-processed target table database or schema name and backend-processed target table name may be different to the associated database or schema name and table name in the processing frontend server.

The structure and format of the predicates generated through block 918 might depend in part on the at least one column determined from the join condition identified in block 904, in part on the cardinality of the list of results determined through blocks 906, 908 and 910 and in part on the processing backend cluster technology.

Figure 10:
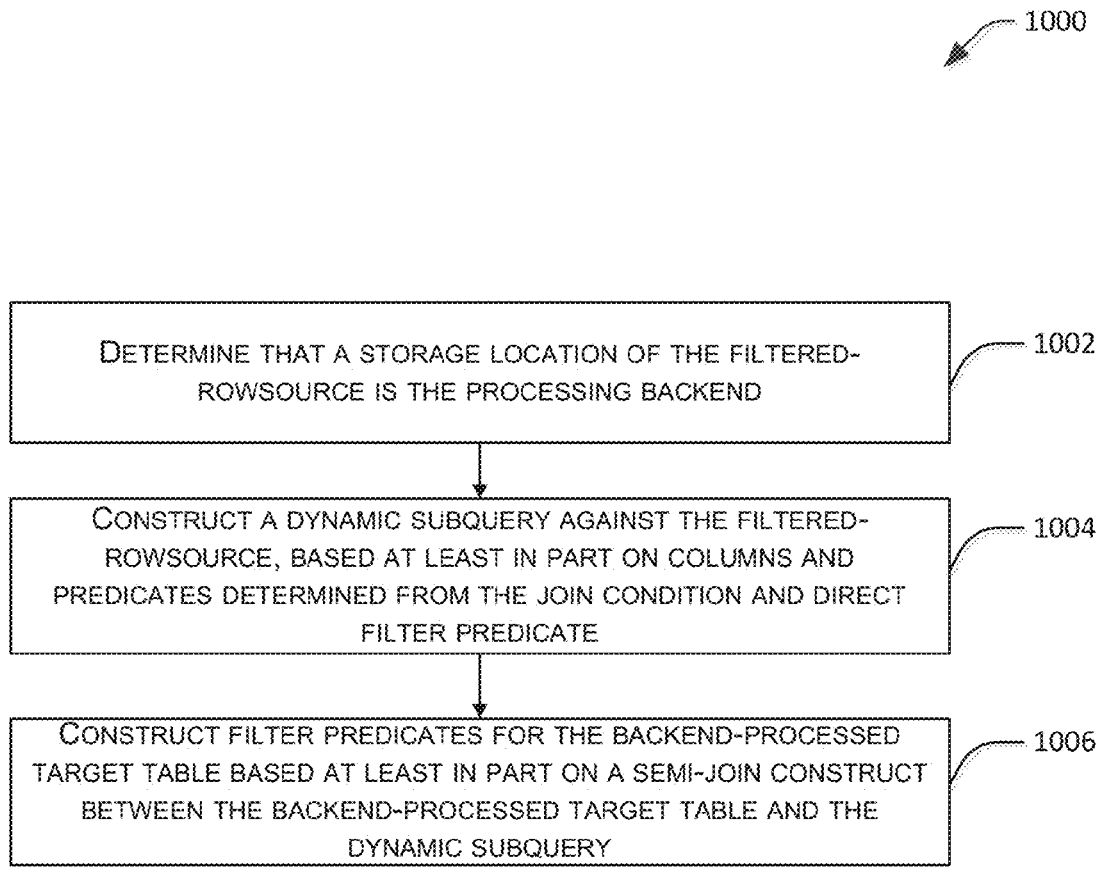
FIG. 10 depicts an illustrative process constructing a filter predicate for data in a storage device, in accordance with one or more embodiments of the disclosure.

FIG. 10 depicts an illustrative process constructing a filter predicate for data in a storage device, in accordance with one or more embodiments of the disclosure. At block 1002, the processor may determine that the storage location of the filtered-rowsource is the processing backend. At block 1004, the processor may construct a dynamic subquery against the filtered-rowsource, based at least in part on columns and predicates determined from the join condition between the backend-processed target table and the filtered-rowsource and the direct filter predicate(s) on the filtered-rowsource. At block 1006, the processor may construct filter predicates for the backend-processed target table based at least in part on a semi-join construct between the backend-processed target table and the dynamic subquery of the filtered-rowsource. This allows the processing backend cluster to filter the target table efficiently with a local semi-join type operator.

The following is an example of what an outcome might be from illustrative process 1000 depicted by FIG. 10. Suppose a hybrid query of the following form is executed on the processing frontend server:

```
SELECT [...columns...]
FROM WAREHOUSE.SALES_FACT
    INNER JOIN
    WAREHOUSE.PRODUCTS_DIM
    ON SALES_FACT.PRODUCT_ID =
    PRODUCTS_DIM.PRODUCT_ID
WHERE PRODUCTS_DIM.PRODUCT_CLASS = 'Books'
```

This example is presented in a simplified pseudo-SQL style for illustrative purposes. In this example, WAREHOUSE.SALES_FACT may be a logical representation of the backend-processed target table and WAREHOUSE.PRODUCTS_DIM may be the filtered-rowsource also present in the processing backend cluster, as determined at block 1002. In some embodiments, a possible outcome of block 1006 may be an additional predicate or set of predicates, generated from the filtered-rowsource and appended to a backend-processed SQL statement as illustrated by the pseudo-SQL below:

```
SELECT [...columns...]
FROM WAREHOUSE.SALES_FACT
WHERE PRODUCT_ID IN (
    SELECT PRODUCTS_DIM.PRODUCT_ID
    FROM PRODUCTS_DIM
    WHERE PRODUCTS_DIM.PRODUCT_CLASS = 'BOOKS')
```

In this example, the backend-processed target table (WAREHOUSE.SALES_FACT) may have the same database/schema name (WAREHOUSE) and table name (SALES_FACT) as its logical representation in the hybrid query executing on the processing frontend server. In some embodiments, the name of the backend-processed target table database or schema name and backend-processed target table name may be different to the associated database or schema name and table name in the processing frontend server.

The structure and format of the predicates generated through block 1006 might depend in part on the at least one column determined from the join condition identified in block 1004 and in part on the processing backend cluster technology.

Figure 11:
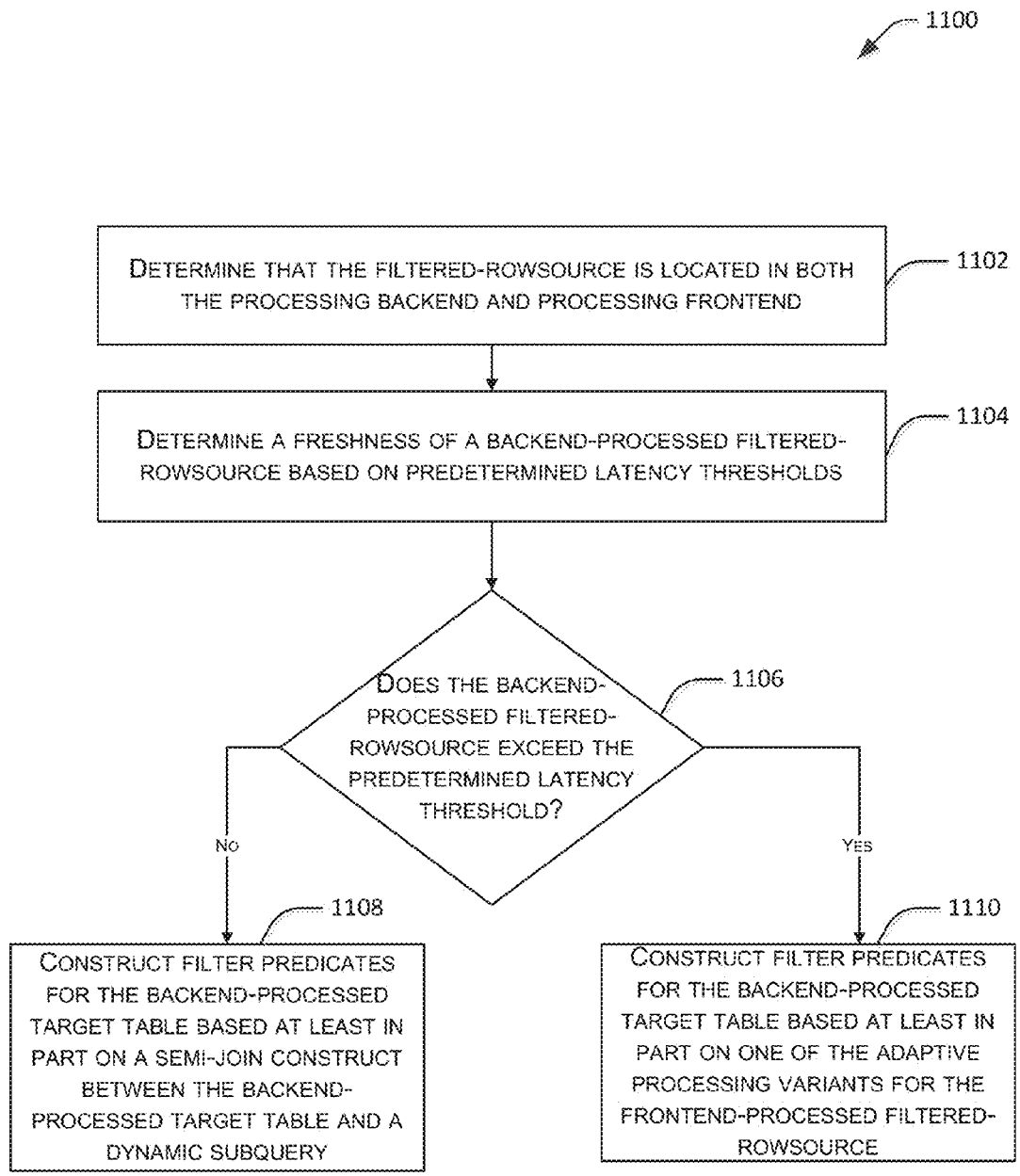
FIG. 11 depicts an illustrative process constructing a filter predicate for data in a storage device, in accordance with one or more embodiments of the disclosure.

FIG. 11 depicts an illustrative process constructing a filter predicate for data in a storage device, in accordance with one or more embodiments of the disclosure. At block 1102, the processor may determine that the filtered-rowsource is located in both the processing frontend and processing backend, with data replication enabled at a predetermined frequency. At block 1104, the processor may determine a freshness of a copy of the backend filtered-rowsource based on predetermined latency thresholds. The copy of the backend filtered-rowsource may be stored in the processing backend. At block 1106, the processor may determine the latency of the backend filtered-rowsource and compare this with a predetermined latency threshold. In some embodiments, the backend filtered-rowsource may not exceed the predetermined latency threshold and the processor may construct filter predicates for the backend-processed target table based at least in part on a semi-join construct between the backend-processed target table and a generated dynamic subquery (block 1108), utilizing illustrative process 1000 depicted in FIG. 10. In other embodiments, the backend filtered-rowsource may exceed the predetermined latency threshold and may therefore be considered ineligible as a source for the join filter(s). Accordingly, the processor may construct filter predicates for the backend-processed target table based at least in part on one or more of the adaptive processing variants for the frontend-processed filtered rowsource, in block 1110, and may generate a target-table predicate by utilizing the most appropriate of the one or more adaptive processing variants depicted in FIGS. 6-9.

Figure 12:
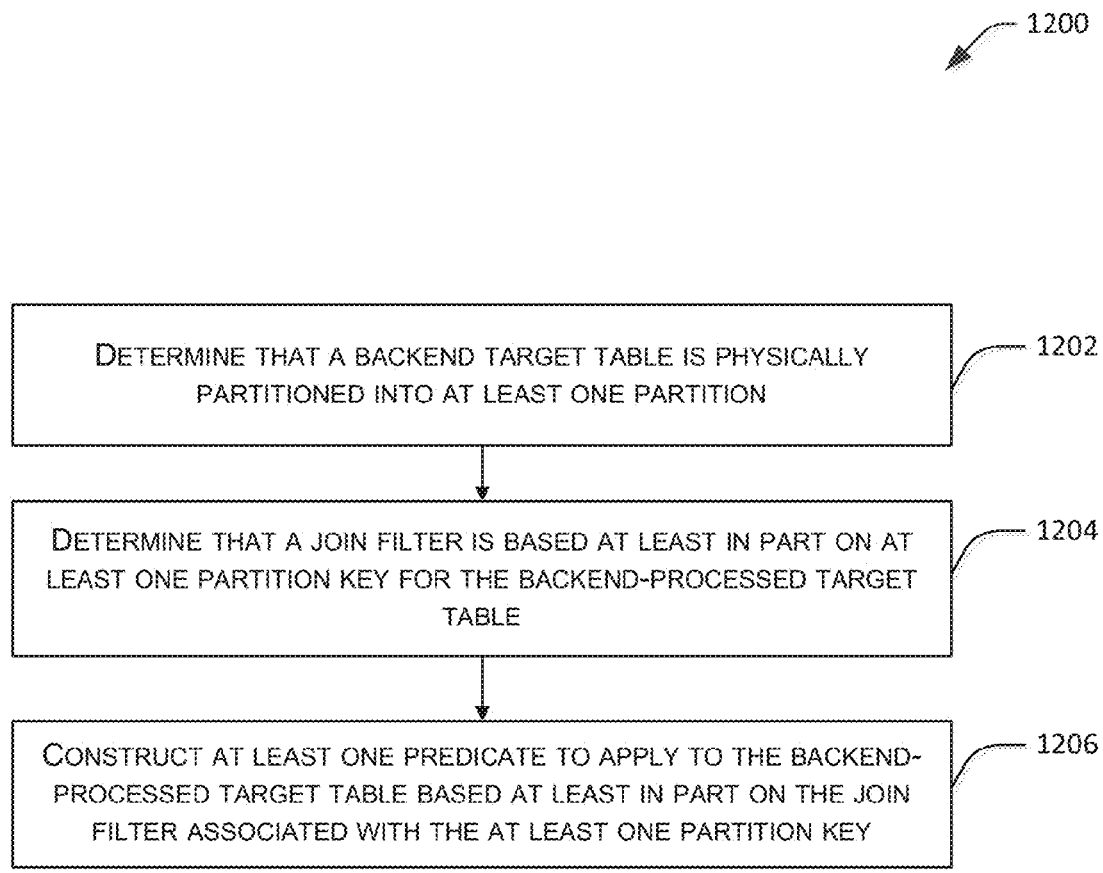
FIG. 12 depicts an illustrative process constructing a filter predicate for data in a storage device, in accordance with one or more embodiments of the disclosure.

FIG. 12 depicts an illustrative process constructing a filter predicate for data in a storage device, in accordance with one or more embodiments of the disclosure. At block 1202, the processor may determine that a backend target table is physically partitioned into at least one partition. At block 1204, the processor may determine that a join filter is based at least in part on at least one partition key for the backend target table. At block 1206, the processor may construct at least one predicate to apply to the backend-processed target table based at least in part on the join filter associated with the at least one partition key.

Illustrative systems and methods for filtering data on various storage devices have been described. Some or all of these systems and methods may, but need not, be implemented at least partially using the illustrative networks depicted in FIG. 1 in combination with the schematic diagram in FIG. 2. It should be appreciated that any of the blocks or operations of any of the methods described herein need not be performed in the order described, may be rearranged or modified, and/or may be omitted entirely, based at least in part on alternative interactions between the components depicted in FIGS. 3-12 or alternative communication interactions between the user device, server devices, and storage devices in FIG. 1. In addition, additional blocks or operations may be introduced beyond those that have been described. Further, any of the blocks or operations described above with respect to any method may be implemented by any number of processors or other programmable devices executing computer-executable instructions that may be stored on one or more computer-readable storage media.

Although embodiments have been described in language specific to structural features and/or methodological acts, it should be appreciated that the disclosure is not necessarily limited to the specific features or acts described. Rather, the specific features and acts are disclosed as illustrative implementations of the embodiments.

That which is claimed is:

1. A system, including:
   at least one first server;
   at least one first storage device;

at least one memory storing computer-executable instructions; and at least one processor configured to access the at least one memory and to execute the computer-executable instructions to:

determine an execution plan tree;

determine a backend-processed target table in the at least one first storage device;

traverse at least one first branch and at least one first node in the execution plan tree until a parent join node of the backend-processed target table referenced by a table-scanning node is reached;

traverse at least one second branch and at least one second node from the parent join node until a rowsource-access node is reached, wherein the rowsource-access node is a root node in the execution plan tree;

determine that the rowsource is referenced at the rowsource-access node;

determine that the rowsource referenced at the rowsource-access node is a filtered-rowsource, wherein the filtered-rowsource is a database table associated with a data structure;

extract at least one join column from a join condition associated with the backend-processed target table and the filtered-rowsource;

determine at least one storage location of the filtered-rowsource;

determine an adaptive processing path based at least in part on the at least one storage location of the filtered-rowsource, the at least one join column determined from the join condition and at least one direct predicate determined for the filtered-rowsource; and generate at least one target filter predicate for the backend-processed target table, to filter the backend-processed target table.

2. The system of claim 1, wherein the at least one first server is a processing frontend server comprising a first memory.

3. The system of claim 2, wherein determining the execution plan tree further comprises reading a first computer-executable instructions from the first memory.

4. The system of claim 3, wherein the first computer-executable instructions comprise at least one binary structure.

5. The system of claim 2, wherein determining the execution plan tree further comprises querying at least one catalog view of the first memory or reading at least one first memory directly.

6. The system of claim 1, wherein the backend-processed target table is referenced by a table-scanning node in an execution plan tree.

7. The system of claim 1, wherein the at least one processor is further configured to access the at least one memory and to execute the computer-executable instructions to:

determine that the rowsource that is referenced at the rowsource-access node is joined to the backend-processed target table.

8. The system of claim 1, wherein the at least one processor is further configured to access the at least one memory and to execute the computer-executable instructions to:

determine that the rowsource referenced at the rowsource-access node is a filtered-rowsource by determining that there is at least one direct filter predicate against the filtered-rowsource.

9. The system of claim 1, wherein the generation of the at least one target filter predicate for the backend-processed target table is based at least in part on the at least one storage location of the filtered-rowsource and the adaptive processing path.

10. A non-transitory computer-readable media storing computer-executable instructions, which when executed by one or more processors cause the one or more processors to perform operations of:

determining an execution plan tree;

determining a backend-processed target table;

traversing at least one first branch and at least one first node in the execution plan tree until a parent join node of the backend-processed target table referenced by a table-scanning node is reached;

traversing at least one second branch and at least one second node from the parent join node until a rowsource-access node is reached, wherein the rowsource-access node is a root node in the execution plan tree;

determining that the rowsource is referenced at the rowsource-access node;

determining that the rowsource referenced at the rowsource-access node is a filtered-rowsource, wherein the filtered-rowsource is a database table associated with a data structure;

extracting at least one join column from a join condition associated with backend-processed target table and the filtered-rowsource;

determining at least one storage location of the filtered-rowsource;

determining an adaptive processing path based at least in part on the at least one storage location of the filtered-rowsource, the at least one join column determined from the join condition and the at least one direct predicate determined for the filtered-rowsource; and generating at least one target filter predicate for the backend-processed target table, to filter the backend-processed target table.

11. The non-transitory computer-readable media of claim 10, wherein determining the execution plan tree further comprises reading a first computer-executable instructions from a first memory in a processing frontend server.

12. The non-transitory computer-readable media of claim 11, wherein the first computer-executable instructions comprise at least one binary structure.

13. The non-transitory computer-readable media of claim 11, wherein determining the execution plan tree further comprises querying at least one catalog view of the first memory.

14. The non-transitory computer-readable media of claim 10, wherein the backend-processed target table is referenced by a table-scanning node in an execution plan tree.

15. A method comprising:

determining an execution plan tree;

determining a backend-processed target table;

traversing at least one first branch and at least one first node in the execution plan tree until a parent join node of the backend-processed target table referenced by a table-scanning node is reached;

traversing at least one second branch and at least one second node from the parent join node until a rowsource-access node is reached, wherein the rowsource-access node is a root node in the execution plan tree;

determining that the rowsource is referenced at the rowsource-access node;

determining that the rowsource referenced at the rowsource-access node is a filtered-rowsource, wherein the filtered-rowsource is a database table associated with a data structure;

extracting at least one join column from a join condition associated with backend-processed target table and the filtered-rowsource;

determining at least one storage location of the filtered-rowsource;

determining an adaptive processing path based at least in part on the at least one storage location of the filtered-rowsource, the at least one join column determined from the join condition and the at least one direct predicate determined for the filtered-rowsource; and generating at least one target filter predicate for the backend-processed target table, to filter the backend-processed target table.

* * * * *

UNITED STATES PATENT AND TRADEMARK OFFICE
CERTIFICATE OF CORRECTION

PATENT NO. : 9,760,604 B2
APPLICATION NO. : 15/383674
DATED : September 12, 2017
INVENTOR(S) : Adrian Brian Billington, Paul Robert Bridger and Tanel Poder Page 1 of 1

It is certified that error appears in the above-identified patent and that said Letters Patent is hereby corrected as shown below:

On the Title Page

Please add Kerry Osborne, Colleyville, TX (US) to the list of inventors, Item (72).

Signed and Sealed this
Twenty-third Day of April, 2019

Andrei Iancu
*Director of the United States Patent and Trademark Office*